(12) United States Patent
Mell

(10) Patent No.: US 11,699,139 B2
(45) Date of Patent: Jul. 11, 2023

(54) INTERACTIVE MOBILE SESSIONS BASED ON POINT-OF-SALE AND NETWORK TRANSACTIONS

(71) Applicant: Mell Innovations, LLC, Cumming, GA (US)

(72) Inventor: Daniel Mell, Cumming, GA (US)

(73) Assignee: Mell Innovations, LLC, Cumming, GA (US)

( * ) Notice: Subject to any disclaimer, the term of this patent is extended or adjusted under 35 U.S.C. 154(b) by 101 days.

(21) Appl. No.: 16/839,263

(22) Filed: Apr. 3, 2020

(65) Prior Publication Data

US 2020/0320503 A1 Oct. 8, 2020

Related U.S. Application Data

(60) Provisional application No. 62/830,028, filed on Apr. 5, 2019.

(51) Int. Cl.
*G06Q 20/32* (2012.01)
*G06Q 20/38* (2012.01)

(52) U.S. Cl.
CPC ..... *G06Q 20/3223* (2013.01); *G06Q 20/3226* (2013.01); *G06Q 20/3821* (2013.01)

(58) Field of Classification Search
None
See application file for complete search history.

(56) References Cited

U.S. PATENT DOCUMENTS

| 8,311,941 | B2 | 11/2012 | Grant |
| 8,554,647 | B1 | 10/2013 | Grigg et al. |
| 8,622,308 | B1 * | 1/2014 | Field ............... G06Q 20/227 235/487 |
| 9,275,418 | B2 | 3/2016 | Johansen et al. |
| 10,068,265 | B2 * | 9/2018 | Lenahan ......... G06Q 20/3274 |
| 11,132,693 | B1 * | 9/2021 | Sahni ............... G06Q 20/10 |
| 2012/0253852 | A1 * | 10/2012 | Pourfallah ......... G06Q 20/36 705/41 |
| 2013/0060670 | A1 | 3/2013 | Galloway et al. |
| 2014/0136381 | A1 | 5/2014 | Joseph et al. |

(Continued)

OTHER PUBLICATIONS

"All bank Money Manager, Track Bank balance & Cards", retrieved from <<https://play.google.com/store/apps/details?id=com.daamitt.walnut.app&hl=en_IN>>, Nov. 20, 2018, 4 pages.

(Continued)

*Primary Examiner* — Chrystina E Zelaskiewicz
(74) *Attorney, Agent, or Firm* — Lee & Hayes, P.C.

(57) ABSTRACT

Techniques described herein include analyzing point-of-sale transactions and initiating interactive mobile sessions responsive to the transactions. Platform servers receive transaction data indicative of a transaction performed via a point-of-sale system, determine additional data associated with server processes, and initiate interactive session with the mobile device to receive the additional data for performing the server processes. Based on the interactive sessions and additional data, the platform servers may enhance fraud detection capabilities and generates compliance records for tax and expense reporting based on the transactions, while supporting credentialing and authentication capabilities.

21 Claims, 22 Drawing Sheets

(56) References Cited

U.S. PATENT DOCUMENTS

| | | | | |
|---|---|---|---|---|
| 2015/0213542 A1* | 7/2015 | Wallaja | ................ | G06Q 20/386 |
| | | | | 705/14.55 |
| 2017/0272447 A1* | 9/2017 | Chen | ...................... | G06Q 20/02 |
| 2017/0339151 A1* | 11/2017 | Van Os | ................... | H04L 63/08 |
| 2019/0304029 A1* | 10/2019 | Murray | .................. | G06Q 20/34 |
| 2019/0306137 A1* | 10/2019 | Isaacson | ............ | G06Q 30/0625 |

OTHER PUBLICATIONS

"All Bank SMS Money Manager, Track Expenses & Budget", retrieved from <<https://play.google.com/store/apps/details?id=com.finart>>, Nov. 20, 2018, 4 pages.

"Boost Efficiency and Productivity with Expense Report Automation", retrieved from <<https://www.happay.in/expense-report-automation.html>>, Nov. 20, 2018, 6 pages.

"Money View Money Manager & Expense Manager", retrieved from <<https://play.google.com/store/apps/details?id=com.whizdem.moneyview>>, Nov. 20, 2018, 5 pages.

"Travel and Expense Management Software", retrieved from <<https://www.happy.in/travel-expense-management-software.html>>, Nov. 20, 2018, 6 pages.

\* cited by examiner

| HOTEL ABC City, State Phone | | Guest: [Guest Name] Room: 212 Dates: 10/27-10/29 | | ONLINE INVOICE |
|---|---|---|---|---|
| Review/Classify Line-Item Charges | | Group By Date | | Group By Type |
| Date | Description | | | Amount |
| 10/27/18 | Room | | | $225.00 |
| 10/27/18 | Tax | | | $19.33 |
| 10/27/18 | Internet | | | $15.89 |
| 10/27/18 | Long Distance Calls | | | $6.13 |
| 10/27/18 | Parking | | | $15.00 |
| 10/28/18 | Room | | | $225.00 |
| 10/28/18 | Tax | | | $19.33 |
| 10/28/18 | Internet | | | $15.89 |
| 10/28/18 | Room Service | | | $32.88 |
| 10/28/18 | Movie | | | $12.99 |
| 10/29/18 | Parking | | | $15.00 |
| 10/29/18 | Room | | | $225.00 |
| 10/29/18 | Tax | | | $19.33 |
| 10/29/18 | Coffee Shop | | | $10.88 |
| 10/29/18 | Fitness Center | | | $5.00 |
| | | | | Total: $862.65 |

900

BUSINESS ABC
CREDIT CARD XXXX-XXXX-XXXX-1234

| GL Type | GL Account | GL Code | Permitted Purchase for Card? |
|---|---|---|---|
| Current Assets | [ALL] | [ALL] | NO |
| | Cash | 100 | |
| | Receivables | 120 | |
| | Inventory | 140 | |
| | Prepaids | 150 | |
| Long Term Assets | [ALL] | [ALL] | |
| | Plant & Equipment | 170 | YES |
| | Accumulated Dep'n | 171 | NO |
| | ... | | |
| Liabilities | [ALL] | [ALL] | NO |
| | Payables | 200 | |
| | Accrued Taxes | 230 | |
| | Deferred Taxes | 240 | |
| | ... | | |
| Operating Expenses | [ALL] | [ALL] | |
| | Advertising | 360 | YES |
| | Amortization | 365 | NO |
| | Auto Expenses | 370 | YES |
| | ... | | |

FIG. 9

INTERACTIVE MOBILE SESSIONS BASED ON POINT-OF-SALE AND NETWORK TRANSACTIONS

RELATED APPLICATIONS

This application is a non-provisional of and claims the benefit of and priority to U.S. Provisional Application No. 62/830,028, filed Apr. 5, 2019, and entitled "Interactive Mobile Sessions For Managing Expense Recording or Reporting." The entire contents of Provisional Application No. 62/830,028 are incorporated herein in their entirety for all purposes.

TECHNICAL FIELD

The present disclosure relates to the analysis, routing, processing and recording of financial transactions. In particular, techniques are disclosed herein for analyzing card-based transactions, credit card-like features embedded within mobile device-based transactions, and other financial transactions, to initiate interactive mobile sessions with cardholders based on the transactions, to enhance fraud detection capabilities and generate tax and corporate reimbursement compliant records based on the transactions while allowing for credential/authentication capabilities.

BACKGROUND

Each year in the United States alone, hundreds of billions of dollars are spent through credit and debit accounts which must be tracked for purposes of reimbursement and tax deductibility compliance. These tracking and reporting techniques are centered around paper or electronic receipts received from merchants. For example, when a purchase is made a cardholder traditionally may have to create an expense voucher and/or tax compliant accounting entry, using the paper or electronic copy of receipt generated by merchant, and supplemented with additional information provided by the cardholder, organization, etc. With these traditional techniques for expense recording and reporting, tax compliance, accounting and personal expense management, etc., individual timeliness and compliance may vary widely. Such traditional processes may require preservation of paper or electronic receipts, and may require a significant effort in manual entry, both of which may be tedious and time consuming for users. Additionally, such systems may result in accounting classification issues, currency conversion reconciliation issues, and may present several opportunities for mistakes and fraud to occur by multiple parties to each transaction.

SUMMARY

Accordingly, aspects described herein provide techniques (e.g., systems, methods, computer-program products tangibly embodied in a non-transitory computer-readable storage medium, etc.) for real-time mobile (SMS, RCS, and/or mobile application based) interactive sessions for recording and supplementing the information provided by credit and debit card transactions. Among the many potential technical advantages of the techniques described herein are reducing (and/or eliminating) the need for traditional receipt-based expense recording/reporting and tax deduction documentation, as well as enhancing of customizable reporting, compliance and fraud detection.

In various examples described herein, an expense report platform (or may be referred to as an expense recording and reporting platform, etc.) may receive indications of financial transactions, and in response may initiate real-time (or near real-time) interactive sessions with the cardholders via their mobile devices. The interactive session may be, for example, an SMS session, a Mobile RCS/business chat session, or a mobile application (e.g., via an IOS or Android app interface), and the mobile session may guide the user (e.g., cardholder) through an interactive menu that allows the user to classify the transaction as a business purchase, personal purchase, or both. In some examples, the expense report platform also may provide real-time fraud analysis and identification, based on best practices as well as business-specific and cardholder specific configuration tools and preferences. In certain cases, an additional tip fraud/tip reasonable check may be performed. Through the interactive session, the user may tag charges in real-time (or near real-time), and provide the required supplemental information and/or supporting documentation for an expense report, compliance form, etc. In various examples, the system may the identify the phone and carrier during a sign-up process, and may select Rich Communication Services (RCS), iMessaging, or a customized mobile app to be used for the interactive sessions. Ultimately, as RCS or equivalent techniques becomes prevalent, the system may migrate to a primarily non application-based interface to communication with the mobile device.

In some cases, the expense report platform may support customization, at the level of the organization, role, and/or cardholder, for general ledger, and for project/purpose business analytics categorization. Such customizations may become part of subsequent prompts during the interactive session, and may allow for subsequent elimination. In some examples, the platform may generate and transmit export files (e.g., a general ledger chart of accounts with functionality to development templates) with the relevant data to integrate with various accounting software packages, SAP, Oracle People Soft, QuickBooks, and may create templates that map to available QuickBooks standard GLs formats, etc. For example, in some cases the cardholder may be prompted during an interactive session to enter a purchase order and/or a receiver number. This data may be stored and used by the platform in certain instances to provide context to a traditional corporate purchase. For example, for a copper purchase for cable production, a company may generate a purchase order and order some or all of the product, and then match the receipt (e.g., receiver paperwork) to the invoice and authorize payment. Because a check is not cut for purchases using a credit card or corporate purchase card, being able to attach these numbers (e.g., a purchase order number or receiver number) may allow the three-way match to be confirmed. Additional features that may be supported by various examples of the platform may include one or more of a tip review/approval feature (by comparing final settled purchase charges to initial pre-approval charges), foreign currency conversion capability source exchange that may be used by credit card issuers and/or processors, meal attendee autocomplete scrape contacts, voice to text, previously entered database sourcing, online editing capability, immediate or deferred response with deferred charges reminders (e.g., deferred status notifications), assignment of individual cards/cardholder to particular departments within the organization, voice-to-text note entry associated with purchases (e.g., with prompt selections from contacts and/or attendees present at the time of the purchase).

Among the several technical advantages of the various examples describes herein, the expense report platform and related systems may allow for tracking of expenses to company approved general ledger (GL) codes and/or purpose project codes, generating and storing enhanced IRS-compliant documentation, real-time completion of required expense/compliance reports or forms rather than end-of-month reporting that requires users to later remember and enter purchase details. Additionally, the techniques described herein may reduce or eliminate lost receipts issues, including the requirement for users to save and/or scan receipts, and may support unclassified charge reporting, and automated currency exchange conversion to the credit card billed amount.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features

Figure 6A:
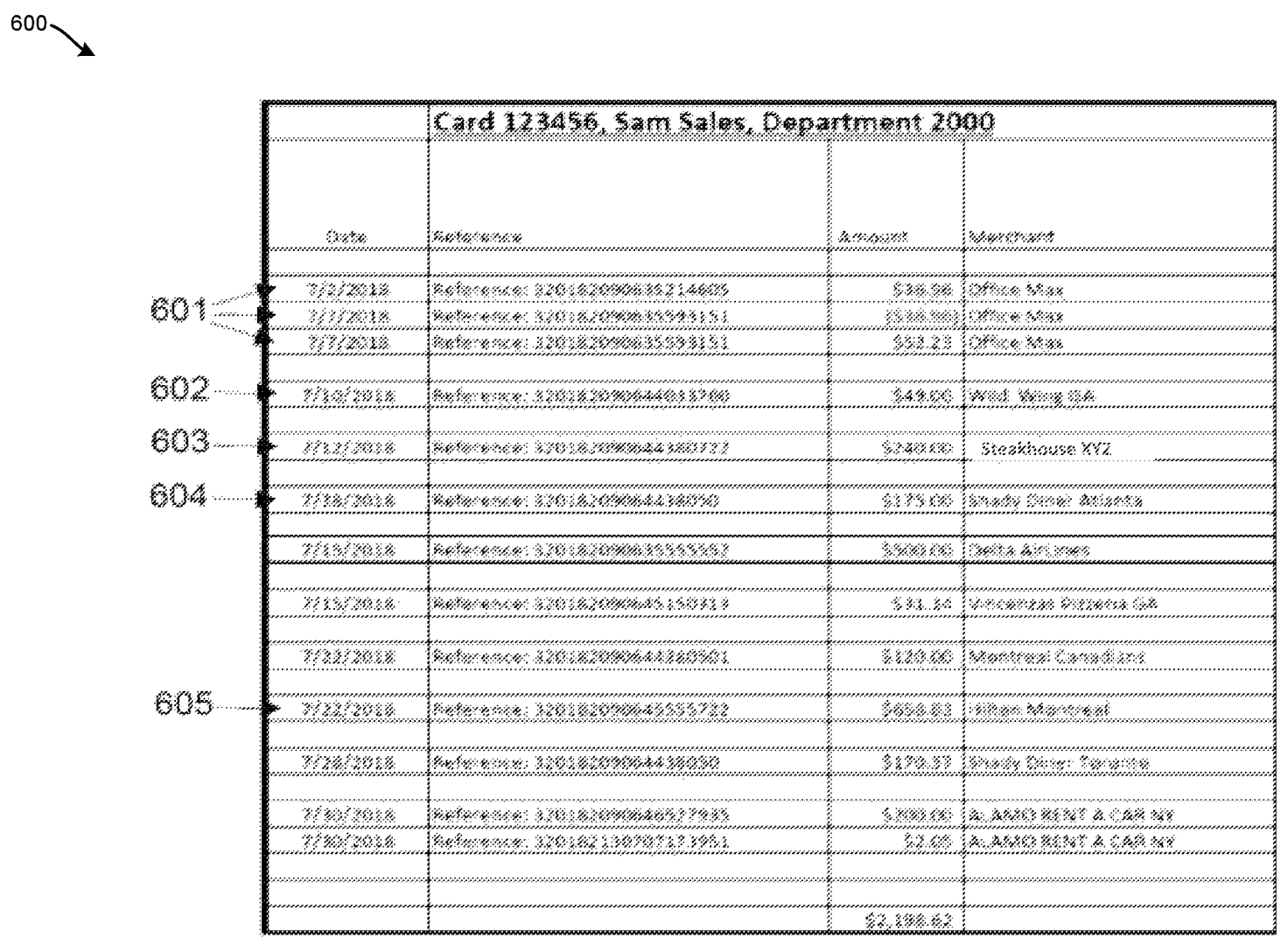
Figure 6C:
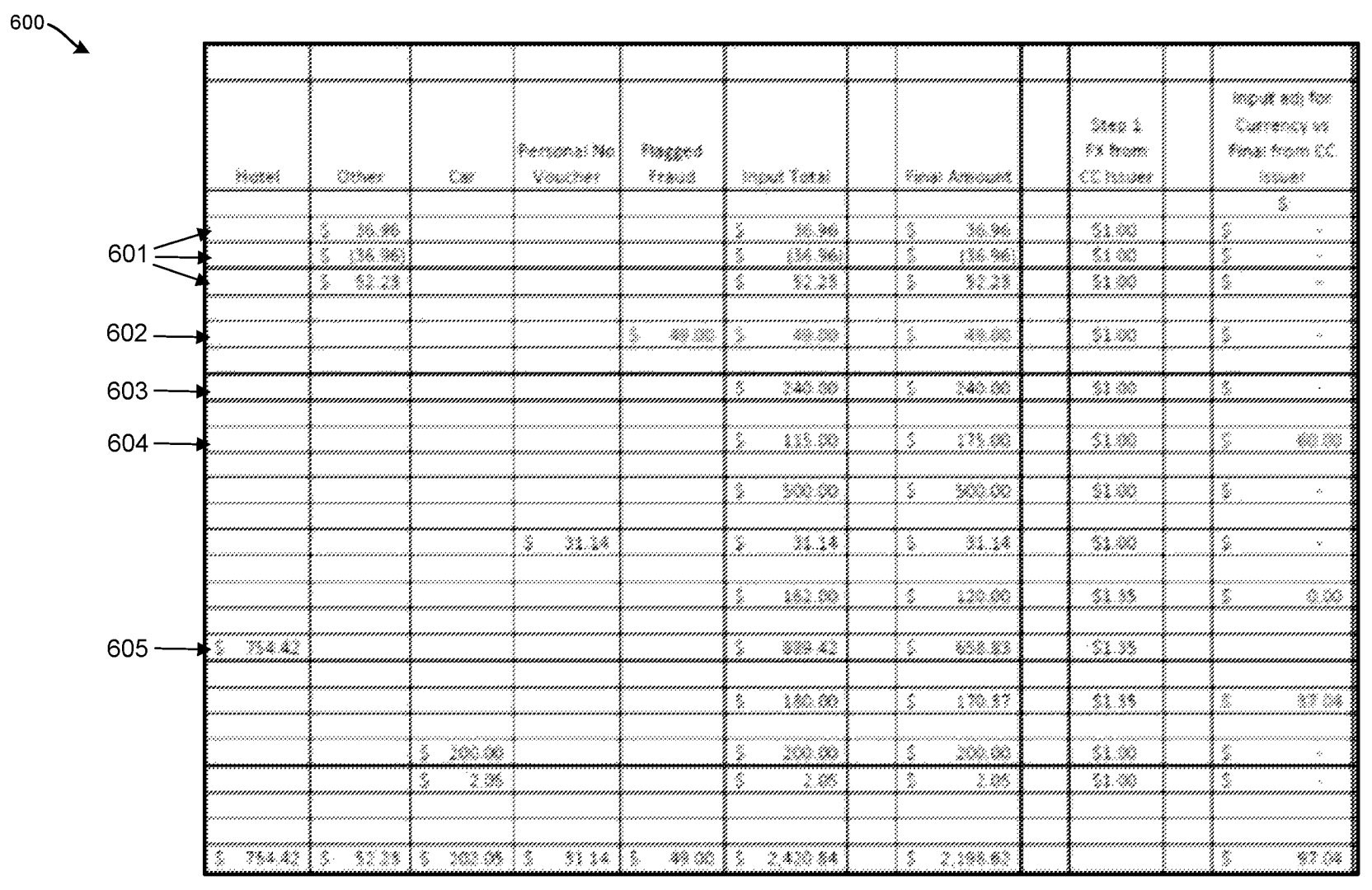
Figure 6D:
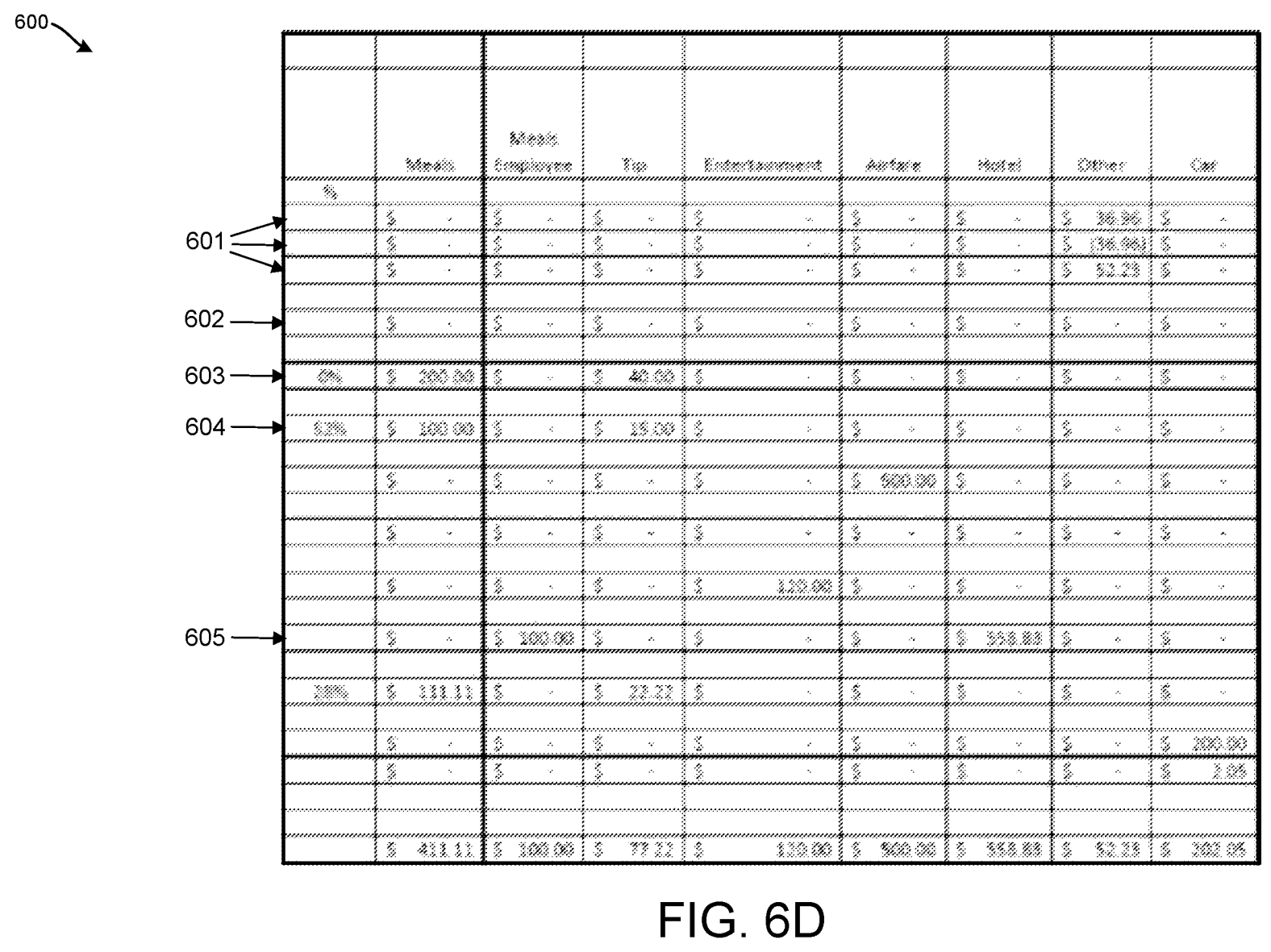

FIGS. 6A-6F illustrate an example purchase report generated in accordance with one or more embodiments of the disclosure.

FIG. 9 is a user interface screen of an example interactive session to perform GL type configuration for a financial instrument, in accordance with one or more embodiments of the disclosure.

Figure 1:
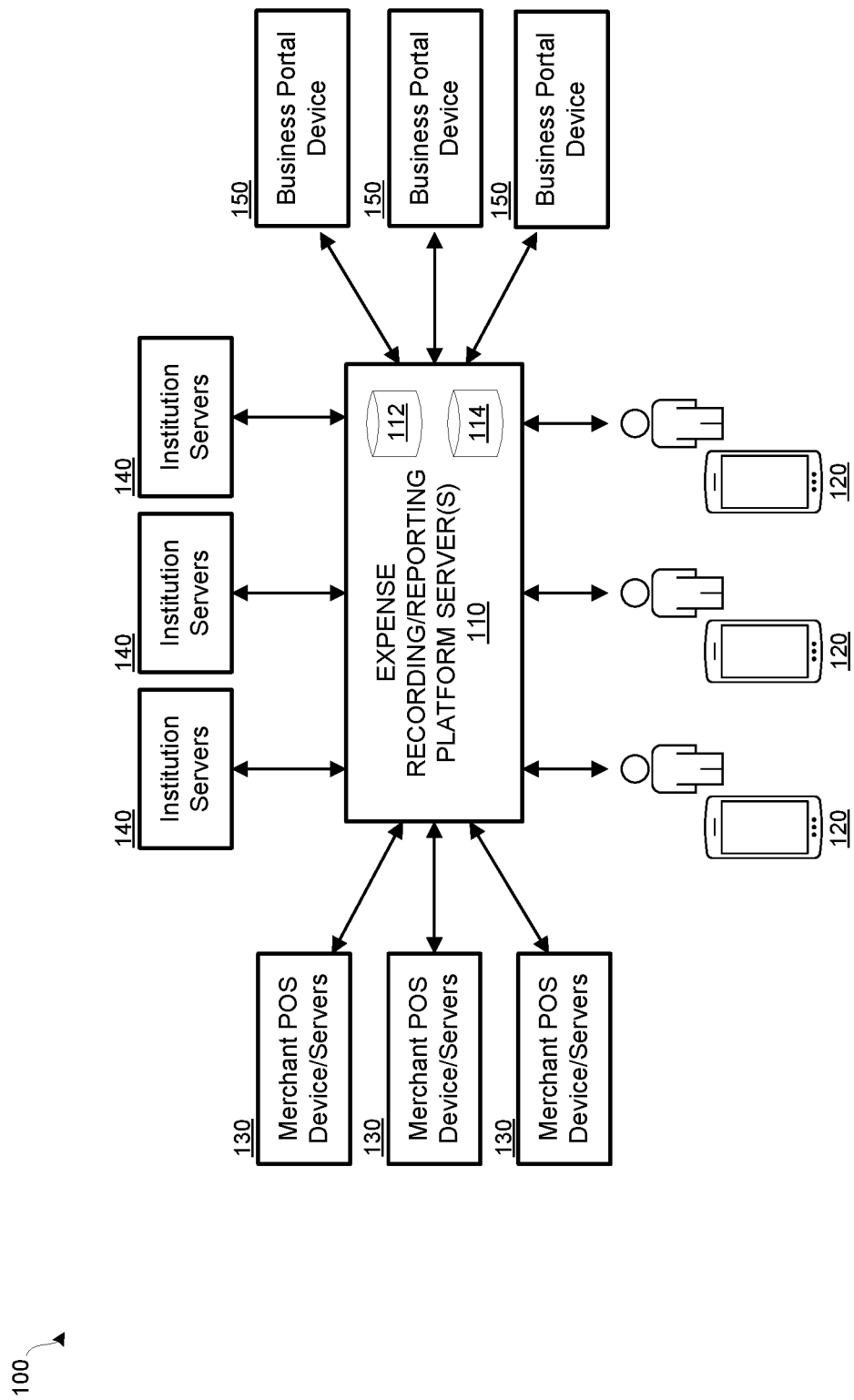
FIG. 1 is a block diagram illustrating a computing environment with a plurality of computing systems configured to process financial transactions, expense recording, compliance and fraud analysis, in accordance with one or more embodiments of the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing operations (or steps) in this disclosure are not intended to be limiting. Other sequences of operations may also be performed according to alternative examples. For example, alternative examples of the present disclosure may perform the operations outlined above in a different order. Moreover, the individual operations illustrated in the figures may include multiple sub-steps that may be performed in various sequences as appropriate to the individual operation. Furthermore, additional operations may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

Referring now to FIG. 1, an example computing environment 100 is illustrated, including one or more servers 110 comprising an expense recording and reporting platform which is configured to interact with a number of mobile devices 120 associated with purchasers/cardholders, a number of merchant systems 130 (e.g., point-of-sale devices, merchant servers, etc.), a number of institution servers 140 (e.g., servers from card issuing banks or other financial institutions), and a number of business portal systems 150 associated with businesses or other organizations. Various aspects and embodiments of the present disclosure may be implemented within computing environment 100 and/or similar computing environments, in which servers 110 implementing an expense recording and reporting platform (which also may be referred to herein as an "expense reporting platform," or an "expense recording platform," or as the one or more "platform servers" on which the expense recording and reporting platform may be implemented, etc.) may interact with the various systems 120-150 to receive and analyze financial transactions, initiate interactive mobile sessions with purchasers, classify purchases, detect fraud, and/or generate report/compliance data and forms based on the transactions.

As shown in FIG. 1, the computing environment 100 may include one or more expense report platform servers 110. As described below in more detail, server(s) 110 may correspond one or more backend computer servers which are configured to support unique interfaces and functionalities to various systems 120-150. As shown in this example, a server 110 may support different interactions with different types of systems 120-150, and may support many different simultaneous connections with multiple different systems 120-150. For instance, one or more API's within the platform server 110 may be configured to support a variety of different systems 120-150, where different client systems may access the servers 110 over different networks, may run on different operating systems and/or client-side software services, may use different security techniques and protocols, and/or may support different subsets of functionality.

Platform server(s) 110 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Platform servers 110 may include one or more server farms, clusters, or any other appropriate arrangement and/or combination or computer servers. Platform servers 110 may act according to stored instructions located in a memory subsystem of the servers 102, and may run an operating system, including any commercially available server operating system and/or any other operating systems discussed herein. Platform servers 110 may include one or more data stores 112-114, such as database servers and file-based storage systems. Data stores 112-114 may include stored data relevant to the functions of the platform servers 110, for example, listings of general ledger (GL) codes, purpose or project codes, business-specific and/or cardholder specific listings of approved purchase types/codes, purchase limits, purchase histories, and other purchase rules or preferences. In some embodiments, multiple data stores 112-114 may reside on a server 110, either using the same storage components of server 110 or using different physical storage components to assure data security and integrity between data stores. In other embodiments, each data store may have a separate dedicated data store server.

Platform server(s) 110 may communicate with and support a variety of interactions with mobile devices 120. Mobile devices 120 may include devices such as smartphones, laptops, tablet computers, personal digital assistants, wearable computing devices, and/or user-implanted computing devices, among others. Various mobile devices 120 may run different mobile operating systems, and may be enabled for Internet, e-mail, short message service (SMS), Bluetooth®, mobile radio-frequency identification (M-RFID), and/or other communication protocols. As described below in more detail, when a user/cardholder makes a purchase at a merchant location (e.g., with a credit or debit card), the servers 110 may determine one or more particular mobile devices 120 associated with the user, and may initiate interactive sessions with those mobile devices 120 to obtain additional information about the purchase, perform fraud checking, etc. Additionally, the servers 110 may provide confirmations and/or may transmit completed expense report forms, tax compliance forms, etc., back to the user's mobile devices 120 (and/or back to business devices/servers 150) after completing the analyses and generating any necessary forms. Further, in some embodiments, mobile devices 120 may themselves be used for the purchases, for instance, using a mobile payment application, mobile wallet with cryptocurrency, etc. In such embodiments, the mobile device 120 may be configured to transmit purchase information directly to the expense report platform servers 110, so that the servers 110 may receive the purchase data quicker and need not communicate with additional financial institutions and/or credit card networks.

As shown in this example, the servers 110 also may communicate with and support a variety of interactions with merchant devices and systems 130. Merchant devices/systems 130 may include devices operating at the purchase location (e.g., retail store, restaurant, hotel, airport, etc.), or may correspond to backend systems of the merchant. Thus, merchant systems 130 may include point-of-sale devices and/or wireless mobile devices, or may be merchant servers communicating via backend services over secure networks, etc. In some embodiments, when a purchase is made at a merchant location by a user/cardholder, the merchant devices/systems 130 may report the purchase to the expense report platform servers 110. Additionally or alternatively, the servers 110 may request additional purchase data and details from the merchant system 130 on certain purchases, and these additional details may assist the servers 110 with analyzing, classifying, and processing the purchase. For instance, if the servers 110 receives information indicating a purchase made at a restaurant, then the servers 110 may contact a merchant system 130 for the restaurant with data requests to verify an amount, time, tip amount, number of customers, food versus alcohol tab breakdown, and any other potentially relevant information for expense classification and approval. As another example, if the servers 110 receives hotel bill information, from an institution server 140 (e.g., server associated with a bank or other financial institution) or user's mobile device 120, then the servers 110 may contact a merchant system 130 for the hotel with data requests to itemize the bill by dates, purchase types (e.g., room, food, parking, etc.). Thus, in various embodiments, either the merchant system 130 or the platform servers 110 may initiate communication sessions and request information from the other. However, in some embodiments (e.g., non-participating merchants), the servers 110 might obtain purchase information and details entirely from other sources (e.g., user devices 120, issuing institution server 140, etc.) and might have no communication with a merchant system 130.

Additionally, the servers 110 also may communicate with and support a variety of interactions with issuing institution servers 140 and/or other financial institutions used to authorize and/or process purchases made by users/cardholders. An "issuing institution" may refer to the financial institution that issued a credit card, debit card, checks, or other financial instruments (digital or physical) to allow users to make purchases. Thus, during the processing and approval chain for purchases (described below in FIG. 2), the issuing institution may receive an indication that a purchase has been made and may be responsible for analyzing, approving, and reconciling the purchase. Thus, in some embodiments, an issuing institution server 140 may have certain purchase information and may contact the platform servers 110 to provide the transaction details to the servers 110. Similarly, in some cases, the servers 110 may request additional purchase data and details from the issuing institution server 140 on certain purchases, and these additional details may assist the servers 110 with analyzing, classifying, and processing the purchase, as described in more detail below. Alternatively, in some embodiments (e.g., non-participating banks), the servers 110 might obtain purchase information and details from other sources (e.g., user devices 120, merchants 130, acquiring banks, etc.) and might have no communication with an issuing institution server 140.

Business portal systems 150 also may be included within the computing environment 100 and may communicate and interact with the platform servers 110 to provide various functionalities for expense recording and reporting, tax compliance, financial management, and the like, for multiple businesses or organizations that may use the servers 110. Business portal systems 150 may include mobile devices and other user devices (e.g., laptop or desktop computers), backend servers, or any other computing devices capable of accessing the business portals provided by the platform servers 110. Such portals may be web based, application based, and/or implemented via backend software services, and thus business portal systems 150 may be equipped with the corresponding client-side software tools. As described below in more detail, authorized users such as the CEO, CFO, controller, and/or authorized administrator of a business or organization may use the portals provided by the servers 110 (e.g., including GUIs and/or programmatic interfaces) to perform various configurations and functionality specific to the business or organization. For example, an authorized user may access the business portal to review and define subsets of approved general ledger (GL) codes and/or purpose project codes for particular financial instruments (e.g., credit or debit cards) and/or for particular users/cardholders. Such users also may review and modify taxonomies of different purchase types (e.g., GL codes), which define how purchases are classified and grouped for the purposes of accounting, expense recording and approvals, tax compliance analyses, and the like. Additionally, the servers 110 may generate and provide output documents or files (e.g., expense reports, tax forms, accounting documents, etc.), to the businesses/organizations in physical or digital form via the business portal systems 150, to authorized representatives of the business or organization.

Further, although the various communication networks and physical network components have not been shown in FIG. 1, so as not to obscure the other elements depicted, it should be understood that any number of compatible network hardware components and network architecture designs may be implemented in various embodiments to support communication between the platform servers 110 servers and various other systems 120-150. Such communication network(s) may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the various devices in FIGS. 1 and 2 may be local area networks (LAN), such as one based on Ethernet, Token-Ring and/or the like. Such network(s) also may be wide-area networks, such as the Internet, and/or may include financial/banking networks, telecommunication networks such as a public switched telephone networks (PSTNs), cellular and/or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
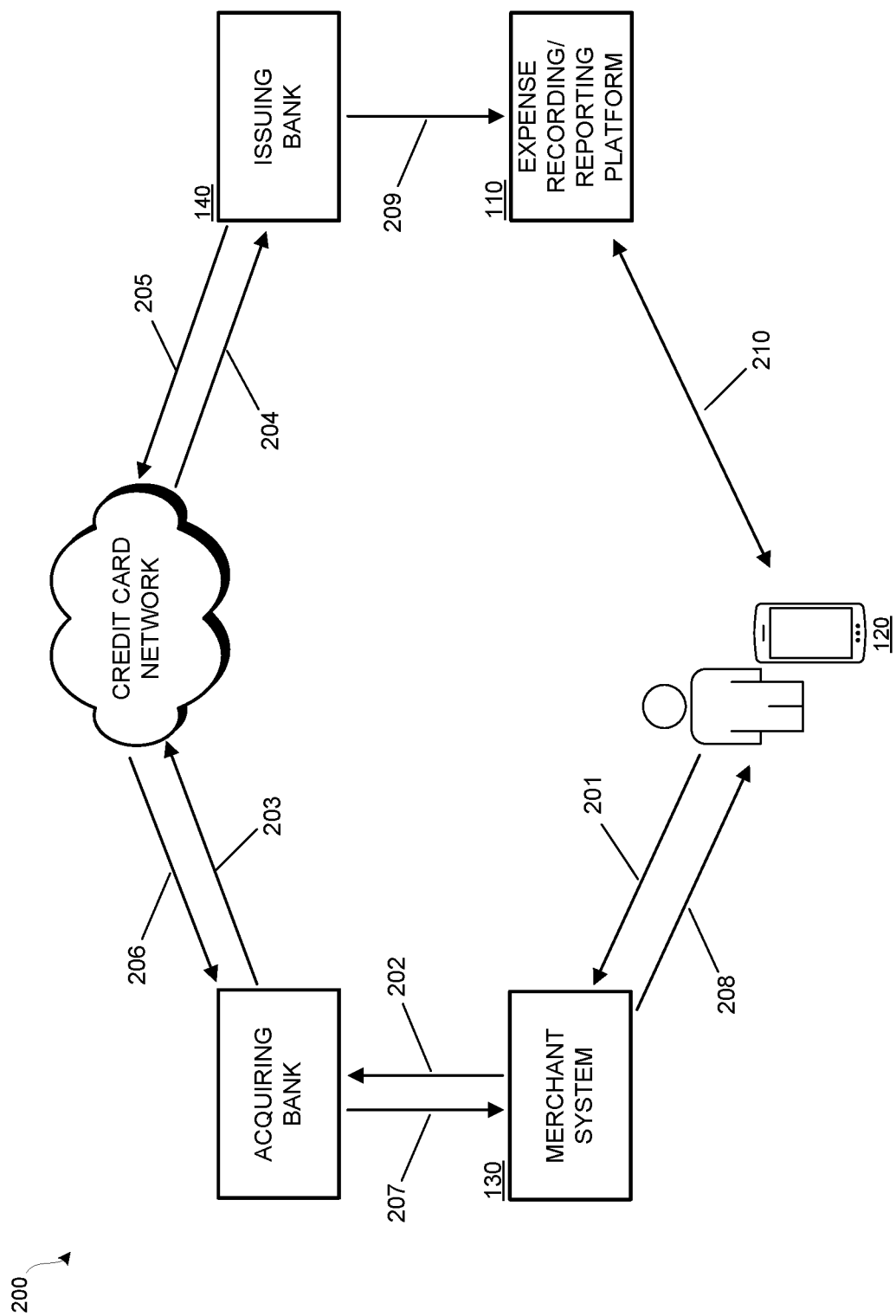
FIG. 2 is another block diagram illustrating a computing environment configured to process card-based or mobile-based financial transactions, in accordance with one or more embodiments of the disclosure.

Referring now to FIG. 2, another component block diagram is shown illustrating a computing environment 200 with components configured to process financial transactions. In some embodiments, computing environment 200 may be similar or identical to computing environment 100, although additional components are depicted in this example. Along with the components shown within computing environment 200, a set of operations 201-210 is labeled to illustrate the processing of a financial transaction in accordance with the aspects described herein. For example, as discussed above in connection with FIG. 1, the processing and approval of a financial transaction may begin at operation 201 with user attempting a purchase at a merchant location such as a store, restaurant, gas station, or hotel. Such purchases may be made with financial instruments such as credit cards, debit cards, checks, and/or mobile payment applications via the user's device 120.

Certain embodiments described herein also may be compatible with other types of purchases, such as cash purchases, cryptocurrency purchases, gift card purchases, and/or mobile payment techniques that do not require backend server authorization. However, these additional types of purchases may use a different and simpler processing architecture, without the need for settlement via financial institutions or a credit card network. Thus, in some embodiments, a cash purchase, cryptocurrency purchase, and the like may be reported directly from the user mobile device 120 and/or merchant system 130 to the expense report servers 110.

Returning to the processing and approval steps of FIG. 2, the user initiates the purchase process by presenting a financial instrument (e.g., card) to a merchant for payment of a good or service. The card may be read or swiped by a POS system at the merchant location, which may capture the card number and/or other account information by reading the magnetic stripe, or EMV-compliant chip within the card. For mobile payment applications, mobile commerce transactions, and like (e.g., mobile wallet, Apple Pay, etc.) the card/account details may be virtually stored within a secure application on the user's mobile device 120 and transmitted to the merchant POS device via near-field communication (NFC) technology, Bluetooth, or other wireless communication protocol. Additionally, for eCommerce transactions such as Internet-based purchases, a merchant POS device may be replaced by a merchant web server, and the user may input a credit card number or other payment information into an online storefront checkout page. For some Internet purchases, an online wallet and/or mobile payment techniques (e.g., PayPal), may be used to transmit the appropriate payment/account information to the merchant web server.

At operation 202, a merchant system 130 may transmit the customer's payment information (e.g., card number and associated information) to an acquiring institution (e.g., bank), for example, via a telephone network or computer network such as the Internet. Both for transactions made in-person at a merchant location, or for Internet/eCommerce transaction, the customer's card information may be encrypted before transmission to the merchant's acquiring institution via an online gateway. At operation 203, the acquiring institution may identify an appropriate payment network associated with the customer's credit or debit card (or other payment account information) affiliated with the card (e.g., financial networks for Visa, MasterCard, etc.) and then the acquiring institution may transmit the customer's card number and details to the appropriate credit card network. The credit card network (or other financial network) may receive the request for payment authorization at operation 203, identify the correct issuing institution server 140 for the user's particular card, and then route the transaction to the issuing institution server 140 at operation 204. After receiving the request for payment authorization at operation 204, the issuing institution server 140 may perform various analyses and evaluations to determine whether or not to authorize the transaction. For instance, the issuing institution server 140 may retrieve transaction data and balances from its account and transaction systems, and then confirm that the customer's account is in good standing, verify that the customer has sufficient funds in an account (or a sufficient credit limit) to cover the amount of the purchase, and/or assess the fraud risk of the transaction.

At operation 205, after the customer's card issuing institution server 140 approves or declines the transaction, the issuing institution server 140 may send back the response to the credit card network. The credit card network may receive the authorization (indication of approval or decline) from the issuing institution server 140 and may forward it to the merchant's acquiring institution at operation 206, which may send the authorization at operation 207 to the merchant system 130. At operation 207, the merchant system 130 (e.g., merchant POS at the merchant's business location, or merchant web server) may provide an approval and transaction receipt for the customer, such as a confirmation number, transaction number, and/or printed or emailed receipt. Additionally or alternatively, for Internet purchases or other mobile commerce transactions, an approval/confirmation/receipt may also be transmitted to the customer's mobile wallet application within mobile device 120, or to the customer via email.

In addition to operations 201-208, which may be similar or identical to credit card purchase processing performed in conventional systems, the example in FIG. 2 includes at least one additional system (e.g., the expense report platform servers 110, and/or the customer's mobile device 120), as well as additional processing operations 209 and 210. Operations 209 and 210 include the transmission of a purchase notification and/or transaction details to the expense report platform servers 110 (operation 209), and then an interactive session between the platform server 110 and the user's mobile device 120 (operation 210). In various embodiments, operations 209 and 210 may before, concurrently with, or after operations 202-208. Although in this example the cardholder's issuing institution server 140 provides the transaction details to the platform server 110 at operation 209, in other cases these details may be provided by other entities (e.g., the user via mobile device 120, the merchant system 130, a separate third-party system, etc.). For instance, in embodiments configured to support cash transactions, cryptocurrency transactions, and/or additional transactions that do not involve a financial network, an application on mobile device 120 may be configured to automatically provide transaction details (operation 209) and/or initiate an interactive session (operation 210) directly with the servers 110, effectively cutting out operations 202-207.

As noted above, at operation 209, the expense report platform server 110 may receive purchase transaction details from the customer's card issuing institution server 140 (or from other sources in other examples). In various embodiments, the purchase transaction details may be transmitted to the servers 110 at operation 209 as soon as possible by the issuing institution server 140 or other data source, or alternatively the platform might not be notified of the purchase until after it is approved by the issuing institution server 140. The purchase transaction details provided to the platform server 110 at operation 209 may include any or all of the purchase details known to the issuing institution server 140 (and/or additional details received from the merchant in some case), such as the merchant name, purchase amount, time, date, merchant address, etc.

At operation 210, the platform server(s) 110 may initiate an interactive session with the cardholder's mobile device 120, in response to the purchase transaction indication/transaction details received at operation 209. To perform operation 210, the platform server(s) 110 may first identify the individual user/cardholder, and may determine one or more mobile devices 120 associated with the cardholder. For example, a platform server 110 may use a lookup table to identify a plurality of mobile devices (e.g., mobile phones, laptops, wearable or implanted devices, vehicle-based devices, etc.), and may initiate contact one or more of these devices to perform the interactive session. In some cases, the platform server 110 may select a particular mobile device 120 from a plurality of the user's mobile devices 120, based on the characteristics of the devices, the purchase, and/or current device status data. For instance, for gas purchases, drive-thru purchases, and/or other purchases where the platform server 110 determines (e.g., based on GPS data) the user is likely to be driving (or soon will be driving), then the platform server 110 may initiate the interactive session as a voice response session with the user's vehicle-based digital assistant 120. In other cases, the platform server 110 may initiate the session via the user's smartphone, smart watch, or other personal handheld device. If the purchase is an Internet or eCommerce purchase, then the platform server 110 may initiate the session via the same device used to perform the Internet or eCommerce purchase, and so on.

As noted above, the interactive session at operation 210 may be initiated in real-time (or near real-time) in response to the receipt of the transaction details, so that additional purchase details and information that may be asked are still fresh in the mind of the user/cardholder. As discussed in more detail below in reference to FIGS. 4 and 5A-5C, the interactive session performed at operation 210 may be used to illicit additional purchase information from the user that may be required for expense report purposes, tax purposes, accounting or financial management purposes, etc. Such interactive sessions may be performed, for example, via a sequence of Rich Communication Service (RCS) messages, via a specialized mobile software application installed on the mobile device 120, or via a sequence of SMS text messages. In any of these and other implementations, the particular questions asked of the user during the interactive session may be customized and based on a variety of factors including the types of purchase, merchant, and amount, the characteristics of the individual cardholder/user, the characteristics of the business/organization associated with the card or other financial instructions. Such sessions also may be customized and dynamic, in the sense that the particular questions asked and data requested during the session may be based on the user's answers to previous questions within the same session.

Figure 3A:
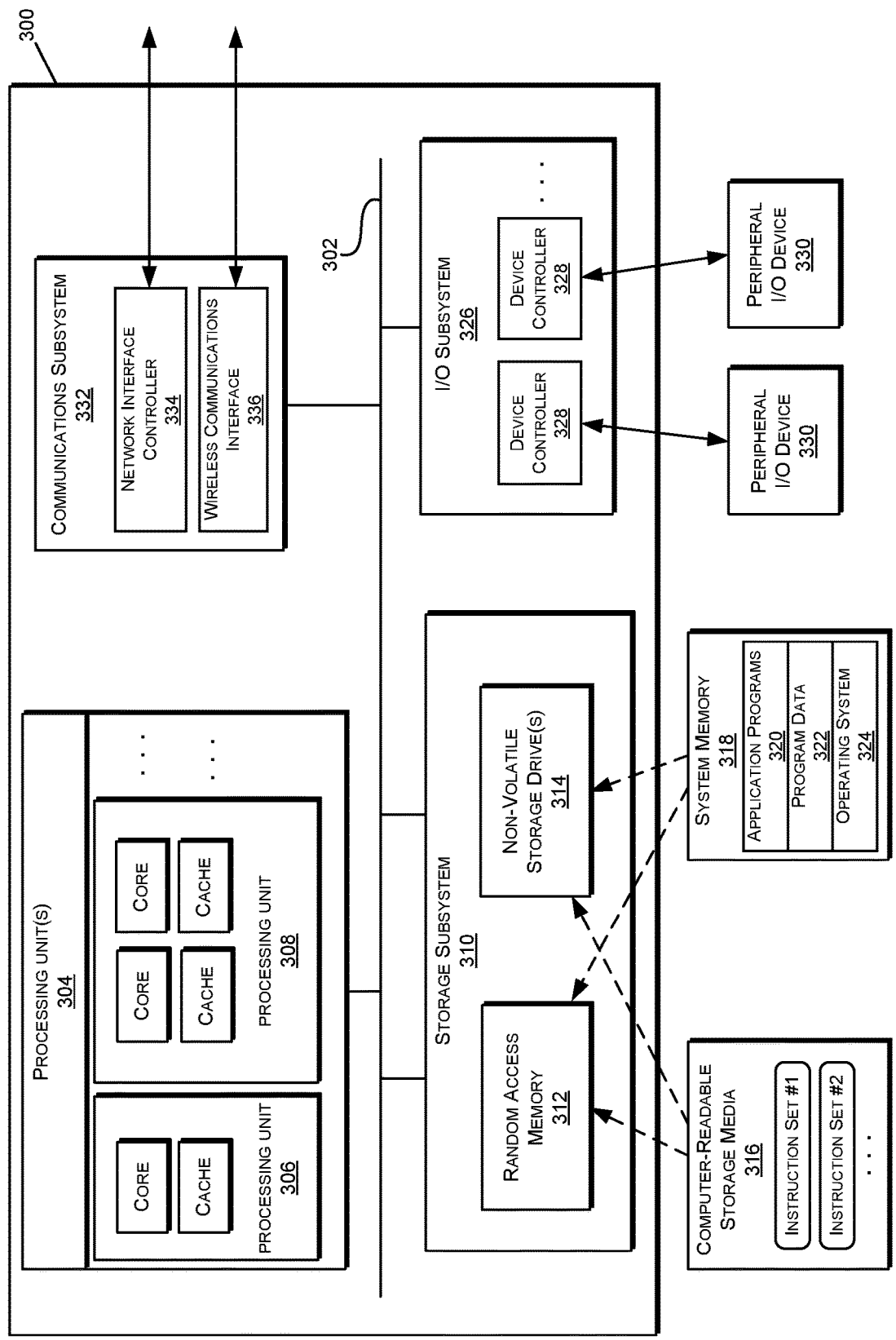
FIG. 3A is a block diagram illustrating the physical and logical components of a special-purpose computer device within an electronic transfer network, according to one or more embodiments of the disclosure.

With reference now to FIG. 3A, a block diagram of an illustrative computer system is shown. The system 300 may correspond to any of the computing devices or servers of the computing environment 100 described above, or any other computing devices described herein. In this example, computer system 300 includes processing units 304 that communicate with a number of peripheral subsystems via a bus subsystem 302. These peripheral subsystems include, for example, a storage subsystem 310 (or memory 310), an I/O subsystem 326, and a communications subsystem 332.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which may be implemented as one or more integrated circuits (e.g., a conventional microprocessor or microcontroller), controls the operation of computer system 300. One or more processors, including single core and/or multicore processors, may be included in processing unit 304. As shown in this example, processing unit 304 may be implemented as one or more independent processing units 306 and/or 308 with single or multicore processors and processor caches included in each processing unit. In other embodiments, processing unit 304 may also be implemented as a quad-core processing unit or larger multicore designs (e.g., hexa-core processors, octo-core processors, ten-core processors, or greater. As discussed above, in some cases, processing unit 304 may include one or more specialized ASICs designed and configured for cryptocurrency mining and/or specialized cryptographic hardware for handling cryptocurrency transactions.

Processing unit 304 may execute a variety of software processes embodied in program code, and may maintain multiple concurrently executing programs or processes. At any given time, some or all of the program code to be executed can be resident in processor(s) 304 and/or in storage subsystem 310. In some embodiments, computer system 300 may include one or more specialized processors, such as digital signal processors (DSPs), outboard processors, graphics processors, application-specific processors, and/or the like.

I/O subsystem 326 may include device controllers 328 for one or more user interface input devices and/or user interface output devices 330. User interface input and output devices 330 may be integral with the computer system 300 (e.g., integrated audio/video systems, and/or touchscreen displays), or may be separate peripheral devices which are attachable/detachable from the computer system 300.

Input devices 330 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 330 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 630 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 330 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 300 to a user or other computer. For example, output devices 330 may include, without limitation, a variety of display devices that visually convey text, graphics and audio/video information such as monitors, printers, speakers, headphones, automotive navigation systems, plotters, voice output devices, and modems.

Computer system 300 may comprise one or more storage subsystems 310, comprising hardware and software components used for storing data and program instructions, such as system memory 318 and computer-readable storage media 316. The system memory 318 and/or computer-readable storage media 316 may store program instructions that are loadable and executable on processing units 304, as well as data generated during the execution of these programs.

Depending on the configuration and type of computer system 300, system memory 318 may be stored in volatile memory (such as random-access memory (RAM) 312) and/ or in non-volatile storage drives 314 (such as read-only memory (ROM), flash memory, etc.) The RAM 312 may contain data and/or program modules that are immediately accessible to and/or presently being operated and executed by processing units 304. In some implementations, system memory 318 may include multiple different types of memory, such as static random-access memory (SRAM) or dynamic random-access memory (DRAM). In some implementations, a basic input/output system (BIOS), containing the basic routines that help to transfer information between elements within computer system 300, such as during start-up, may typically be stored in the non-volatile storage drives 314. By way of example, and not limitation, system memory 318 may include application programs 320, such as client applications, Web browsers, mid-tier applications, server applications, etc., program data 322, and an operating system 324.

Storage subsystem 310 also may provide one or more tangible computer-readable storage media 316 for storing the basic programming and data constructs that provide the functionality of some embodiments. Software (programs, code modules, instructions) that when executed by a processor provide the functionality described herein may be stored in storage subsystem 310. These software modules or instructions may be executed by processing units 304. Storage subsystem 310 may also provide a repository for storing data used in accordance with certain examples.

Storage subsystem 310 may also include a computer-readable storage media reader that can further be connected to computer-readable storage media 316. Together and, optionally, in combination with system memory 318, computer-readable storage media 316 may comprehensively represent remote, local, fixed, and/or removable storage devices plus storage media for temporarily and/or more permanently containing, storing, transmitting, and retrieving computer-readable information.

Computer-readable storage media 316 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 300.

By way of example, computer-readable storage media 316 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 316 may include, but is not limited to, Zip® drives, flash memory cards, universal serial bus (USB) flash drives, secure digital (SD) cards, DVD disks, digital video tape, and the like. Computer-readable storage media 316 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 332 may provide a communication interface from computer system 300 and external computing devices via one or more communication networks, including local area networks (LANs), wide area networks (WANs) (e.g., the Internet), and various wireless telecommunications networks. As illustrated in FIG. 3A, the communications subsystem 332 may include, for example, one or more network interface controllers (NICs) 334, such as Ethernet cards, Asynchronous Transfer Mode NICs, Token Ring NICs, and the like, as well as one or more wireless communications interfaces 336, such as wireless network interface controllers (WNICs), wireless network adapters, and the like. Additionally and/or alternatively, the communications subsystem 332 may include one or more modems (telephone, satellite, cable, ISDN), synchronous or asynchronous digital subscriber line (DSL) units, FireWire® interfaces, USB® interfaces, and the like. Communications subsystem 336 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 332 may be detachable components coupled to the computer system 300 via a computer network, a FireWire® bus, or the like, and/or may be physically integrated onto a motherboard of the computer system 300. Communications subsystem 332 also may be implemented in whole or in part by software.

In some embodiments, communications subsystem 332 may also receive input communication in the form of structured and/or unstructured data feeds, event streams, event updates, and the like, on behalf of one or more users who may use or access computer system 300. For example, communications subsystem 332 may be configured to receive data feeds in real-time from users of social networks and/or other communication services, web feeds such as Rich Site Summary (RSS) feeds, and/or real-time updates from one or more third party information sources. Additionally, communications subsystem 332 may be configured to receive data in the form of continuous data streams, which may include event streams of real-time events and/or event updates (e.g., sensor data applications, financial tickers, network performance measuring tools, clickstream analysis tools, etc.). Communications subsystem 332 may output such structured and/or unstructured data feeds, event streams, event updates, and the like to one or more data stores that may be in communication with one or more streaming data source computers coupled to computer system 300.

Due to the ever-changing nature of computers and networks, the description of computer system 300 depicted in FIG. 3A is intended only as a specific example. Many other configurations having more or fewer components than computer system 300 are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3B:
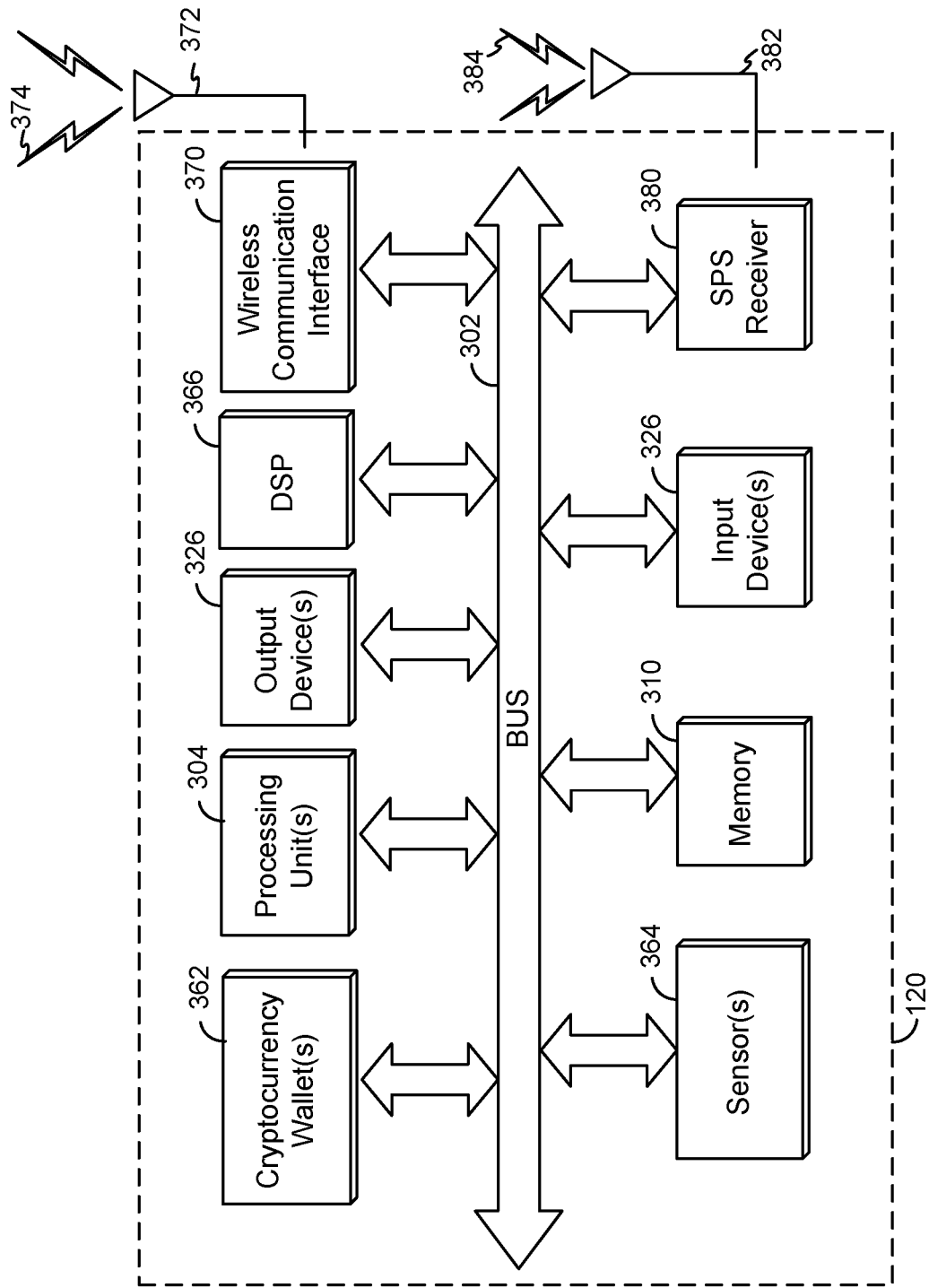
FIG. 3B is a block diagram illustrating the physical and logical components of a special-purpose computer device within an electronic transfer network, according to one or more embodiments of the disclosure.

Referring now to FIG. 3B, a block diagram is shown illustrating the component of an example client device 120, for example, a smartphone or other mobile device, or an Internet-of-Things (IoT) device, which may be utilized as described in the embodiments described herein. It should be noted that FIG. 3B is meant to provide only a general illustration of various components, any or all of which may be utilized as appropriate. As discussed above, client devices 120 may include, for example, mobile devices such as smartphones and tablet computers, as well as other various types of user computing devices (e.g., personal computers, laptops, home monitoring/security display devices, weather station displays, digital picture frames, smart watches, wearable computing devices, and/or vehicle-based display devices). Client devices 120 corresponding to IoT devices, sensor devices, and/or other electronic appliances may include, for example, security systems, intruder and fire alarm systems, utility meters (e.g., for gas, water, electrical, etc.), weather sensors, facility management services, vehicle-based systems, personal appliances/health monitoring devices, industrial appliances and systems (e.g., PLC devices), personal electronic appliances, person or animal tracking devices, lighting systems or speaking systems in public or commercial environments, or governmental infrastructure devices (e.g., street lamps, traffic lights, trash bins, etc.). Because client devices 120 may vary widely in functionality, any particular client device 120 may include only a subset of the components shown in FIG. 3B. Additionally, in some cases, components illustrated in FIG. 3B may be localized to a single physical device and/or distributed among various networked devices, which may be disposed at different physical locations.

The client device 120 is shown in FIG. 3B comprising hardware elements that can be electrically coupled via a bus 302 (or may otherwise be in communication, as appropriate). The hardware elements may include a processing unit(s) 304 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 3B, some embodiments may have a separate DSP 520, depending on desired functionality. The client device 120 also may comprise one or more I/O subsystems 326, including input devices 326 such as touch screens, touch pads, microphones, buttons, dials, switches, and/or the like; and output devices such as one or more displays, light emitting diode (LED)s, speakers, and/or the like.

Mobile client devices 120 may also include a wireless communication interface 370, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMax device, cellular communication facilities, etc.), and/or the like, which may enable the mobile device 120 to communicate via the networks and RATs described above with regard to FIGS. 1-2. The wireless communication interface 370 may permit data to be communicated with a network, wireless access points, wireless base stations, other computer systems, and/or any other electronic devices described herein. The communication can be carried out via one or more wireless communication antenna(s) 372 that send and/or receive wireless signals 374.

Depending on desired functionality, the wireless communication interface 370 may comprise separate transceivers to communicate with base stations (e.g., eNBs) and other terrestrial transceivers, such as wireless devices and access points, belonging to or associated with one or more wireless networks. These wireless networks may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as cdma2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, NR and so on. LTE, LTE Advanced, NR, GSM, and WCDMA are described (or being described) in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The client device 120 may further include sensor(s) 364. Such sensors may comprise, without limitation, one or more accelerometer(s), gyroscope(s), camera(s), magnetometer(s), altimeter(s), microphone(s), proximity sensor(s), light sensor(s), and the like. Some or all of the sensors 364 can be utilized, among other things, for sensing/detecting location data (e.g., sights, sounds, smells, substances, temperatures, etc.) at the location of the client device 120, or for obtaining operational status of an appliance or electrical device, and/or obtaining other types of data that may be communicated to an application server.

Embodiments of client devices 120 may also include an SPS receiver 380 capable of receiving signals 384 from one or more SPS satellites using an SPS antenna 382, which may be combined with antenna(s) 372 in some implementations. Positioning of client devices 120 using SPS receivers 380 may be utilized to complement and/or incorporate the techniques described herein, and may be used to obtain sensor data by the client device 120. The SPS receiver 380 may support measurement of signals from SPS SVs of an SPS system, such as a GNSS (e.g., Global Positioning System (GPS)), Galileo, GLONASS, Quasi-Zenith Satellite System (QZSS) over Japan, Indian Regional Navigational Satellite System (IRNSS) over India, Beidou over China, and/or the like. Moreover, the SPS receiver 380 may be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Additionally, in some embodiments the client device 120 may include a cryptocurrency wallet 362. Cryptocurrency wallet 362 may include one or more executable software components configured to stores private and public keys, and to interact with one or more cryptocurrency blockchains to enable the client device to send and receive digital currency. In some embodiments, one or more types of cryptocurrency may be loaded onto the client device 120, along with predefined instructions/rules specifying when and how much cryptocurrency may be exchanged for various goods/services over time. Additionally or alternatively, a client device 120 may request and receive transfers of cryptocurrency from merchant systems 130, other client devices 120, etc., via a network service provider or other third-party system. In some cases, client devices 120 such as individual smartphones/mobile devices may be entirely standalone devices with respect to funding their own cryptocurrency wallets 362. In other cases, multiple related client devices 120 (e.g., commonly owned devices of an employer, devices associated with an account or customer, etc.) may be configured to exchange cryptocurrencies with one another and/or with the primary cryptocurrency accounts of the owner.

The client device 120 may further include and/or be in communication with a memory 310. The memory 310 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. The memory 310 may be used, among other things, to store sensor data received from sensors 364 using a database, linked list, or any other type of data structure. In some embodiments, wireless communication interface 370 may additionally or alternatively comprise memory.

The memory 310 of client device 120 also may comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality for client device 120 discussed above might be implemented as code and/or instructions executable by client device 120 (and/or a processing unit within the client device 120). Such code and/or instructions may be used to configure and/or adapt a general-purpose computer (or other device) to perform one or more operations in accordance with the described methods.

Figure 4:
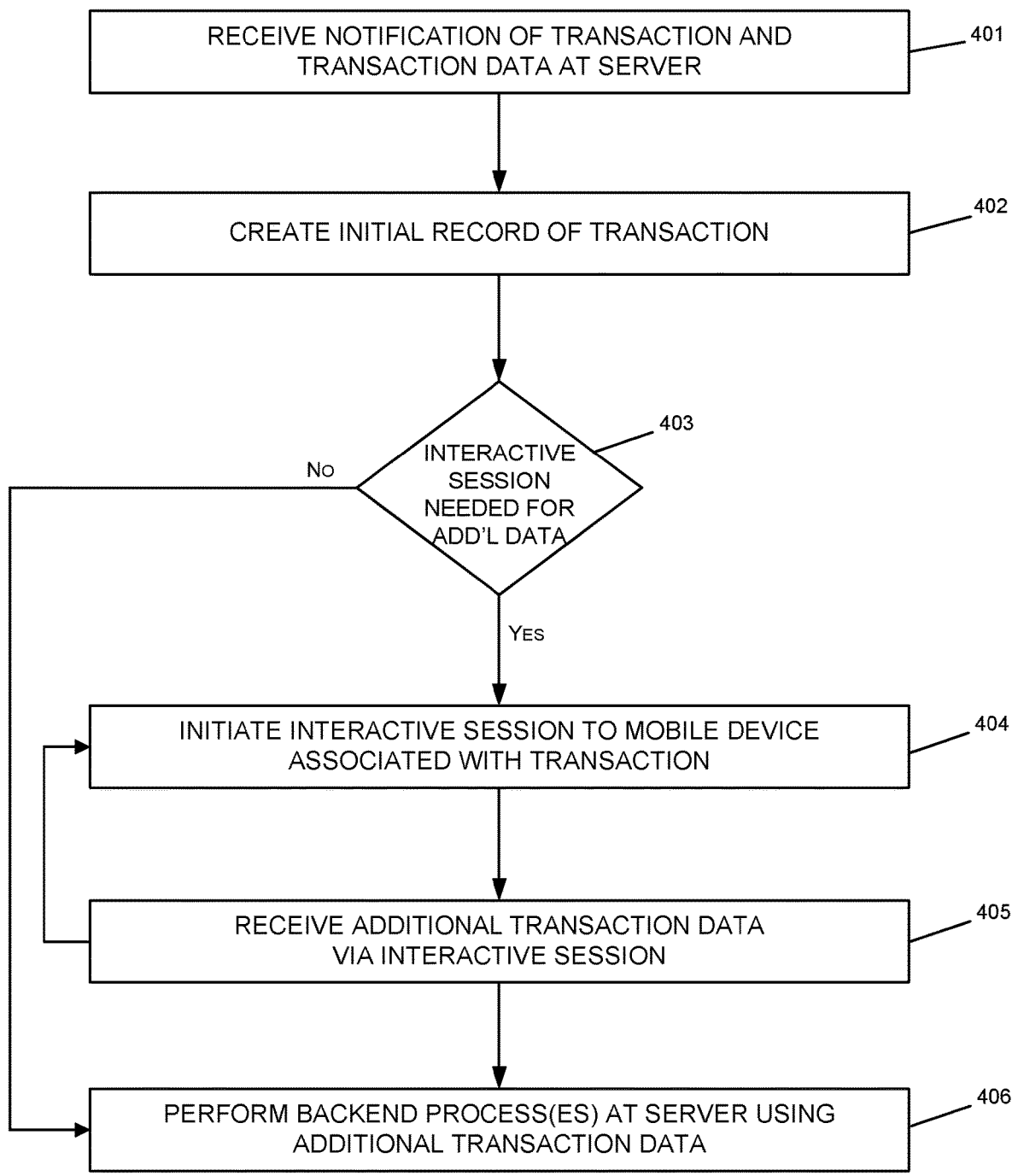
FIG. 4 is a flow diagram illustrating an example process of initiating and executing interactive mobile sessions with users in response to purchases, in accordance with one or more embodiments of the disclosure.

Referring now to FIG. 4, a flow diagram is shown illustrating an example process of initiating and executing interactive mobile sessions with users in response to purchases, in order to retrieve additional data for expense recording and reporting, tax compliance, accounting, and the like. As described below, the operations (or steps) in this process may be performed by one or more platform servers 110, in conjunction with mobile devices 120, merchant systems 130, issuing institution servers 140 and/or other related components, in response to a purchase initiated by a user (e.g., cardholder) at a particular merchant location or online via a merchant website. Thus, the techniques may be described in terms of the computing environments and devices/systems described above in FIGS. 1-3B. However, it should be understood that the techniques and steps described below or are not limited to the particular computing systems and hardware components described above in reference to FIGS. 1-3B, but may be implemented using various other devices or combinations of systems/devices to perform some or all of the features and functionality described below.

At operation 401, a platform server 110 may receive a notification of a transaction (e.g., a card-based purchase or other financial transaction initiated by a user at a merchant location). As discussed above, the transaction may be a purchase made by a cardholder using a credit card or debit card, but it should be understood that the platform server 110 supports other types of transactions made by users as well (e.g., mobile payment applications, cryptocurrency transactions, cash or gift card transactions, etc.). For transactions that may be processed multiple times, such as a restaurant purchase or hotel bill, the platform server 110 may receive notifications at operation 401 that correspond to the initial pre-approved purchases (e.g., restaurant bill before tip, hotel bill before any extra room charges or damage fees, etc.), or notifications that correspond to final settled purchases (e.g., restaurant bill after tip, hotel bill after extra room charges and damage fees), and/or may receive both pre-approved purchase notifications and final settled purchase notifications.

As discussed above, the transaction notification received at operation 401 may include various transaction details, such as the credit card number (or other financial instrument identifier), the purchaser/cardholder name (if known), the merchant name, merchant address, purchase amount, description of the goods/services purchased (if known), the date and time of the purchase, etc. In different cases, only certain of this information may be available and other information might not be available for some purchases. A transaction code generated by the issuing institution also may be provided, which may be used as a reference when the final settlement amount is received. Also as noted above, the notification at operation 401 typically may be received from the issuing institution server 140, but additionally or alternatively such notifications may be received from a user's mobile device 120, merchant system 130, acquiring institution, and/or other data sources. Thus, the transaction details received at operation 401 may depend on which party transmits the notification and purchase details to the platform server, for instance, the merchant system 130 may have more detailed information than the issuing institution server 140, and the user's mobile device 120 may have a different set of purchase information than either the merchant 130 or institution server 140, etc.

At operation 402, the platform server 110 may create an initial record of the transaction based on the notification and transaction details received at operation 401. As noted above, the initial transaction record may include basic data such as the card number or account associated with the purchase, the user/cardholder name, the merchant name, merchant address, and the purchase amount. In some embodiments, the platform server 110 may store the initial transaction record in a local data store (e.g., 112-114), or a remote/separate storage system.

At operation 403, the platform server 110 may analyze the initial transaction record from operation 402, along with additional data such as business-specific, card-specific, and/or user-specific configuration data or preferences, to determine whether or not additional transaction information should be requested from the user regarding the transaction (e.g., purchase). For example, the platform server 110 may determine whether or not the transaction data received in operation 401 includes sufficient data to perform one or more processes (e.g., server processes or backend processes). Such server/backend processes may include any processes described herein performed at the platform server 110 relating to the transaction or purchase, including fraud determination processes, compliance report generation processes, etc. In some embodiments, the determination at operation 403 may include initially identifying the card (or other financial instrument) used to make the purchase, and the individuals, businesses, or organizations associated with the card. For example, a business credit cards may be provided to one or more employees of a particular company, and those employees may use the business credit cards to make business purchases which will be paid for by the company. In other cases, a user may use his/her personal card for both personal purchases and business purchases and may submit the business purchases to the company for reimbursement. Some credit cards or other financial instruments, business or personal, may be shared by multiple employees or users.

Thus, initial determinations made by the platform server 110 at operation 403 may include determining which persons, businesses or organizations are associated with the card that was used to perform the transaction, and if possible, which particular cardholder/user actually performed the transaction using the card. To make these determinations, a card or financial instrument data store may include associations with users and organizations (for both personal and business cards). For shared personal cards and/or business cards, either the card history or card status data may be used to determine which individual user is currently in possession of the card. In other embodiments, GPS data from a user's mobile device 120 may be retrieved and compared to the merchant location to determine which user used a shared card or business card to make the purchase at the merchant location.

After determining the card(s), user(s), and/or business(es) associated with the transaction, the platform server 110 then may retrieve card-specific, user-specific, and/or business-specific configuration data and/or preferences, for example, from local data stores 112 and 114. As discussed below in more details, these configuration data and preferences may define specific sets of rules that apply for expense recording, tax compliance, accounting, financial planning and tracking, etc. Such configuration data and preferences may be setup for particular cards/financial instruments, for particular cardholders/users, for particular businesses or personal accounts, and/or for any combination of these factors.

In some cases, after retrieving a specific set of configuration data or preferences applicable to a card, account, user/cardholder, and/or business, the platform server 110 may determine, based on the purchase transaction details received at operation 401, that no additional data is needed (403:No) to perform the server processes for expense recording and reporting, tax compliance, accounting, etc. For instance, using a business portal system 150, a business or organization may configure an expense report platform server 110 so that any purchase of a particular type and/or below a particular amount may be automatically approved for expense reimbursement, and thus no additional information may be needed (403:No). A business also may configure the platform server 110 so that certain types of purchases and/or certain types of purchases by particular users will be automatically approved or automatically rejected for expense reimbursement, and thus no additional information may be needed in these cases either (403:No). For instance, certain cardholders with an organization (e.g., CEO, CFO, controller, etc.) may be approved for certain types and amount limits of purchases, while other cardholders (e.g., Sales Reps) may have different rules for approval or rejection of expenses based on purchase types and amount limits. Additional rules also may be based on the particular merchant, date, time, and/or location of the purchase, where based on a combination of these factors, along with the identity of the cardholder, type and amount of the purchase, etc., the platform server 110 might automatically determine that the purchase may be automatically approved or rejected for reimbursement without requiring any additional information from the cardholder or other data sources (403:No). The example scenarios and rules above may be applied by a platform server 110 designed and implemented to generate and process a business's expense report data; however, it should be understood that other similar scenarios and rules may be executed at operation 403 for determinations of whether or not to initiate interactive sessions for the purposes of retrieving additional tax compliance data, accounting data, purchase tracking data, organizational budget data, etc.

However, in other cases, using the same transaction data discussed above (e.g., purchase details, and card/cardholder/business configuration data and preferences, etc.), the platform server 110 may determine that additional data is needed (403:Yes) to perform one or more server processes related to fraud detection, expense recording or reporting, tax compliance, accounting, etc. For instance, in order to approve expenses for reimbursement, complete expense report forms, tax compliance forms, etc., the platform server 110 may require one or more additional pieces of data related to the purchase. The types of additional data that may be needed can vary in different scenarios, and several examples are discussed below. However, if any additional data is needed, the platform server 110 may determine at operation 403 that an interactive session should be initiated (403:Yes) with the user that initiated the transaction at the merchant point-of-system (e.g., the cardholder) to collect the additional data. Additionally, as discussed below in more detail, a fraud response may be automatically initiated if, based on the received data (e.g., purchase transaction details, and card/cardholder/business configuration data and preferences, etc.), platform server 110 determines that the purchase is potentially a fraudulent transaction. In some cases, the platform server 110 also may determine at operation 403 that an itemization may be required for certain specific purchases (e.g., a store purchase of multiple items from different classification categories, etc.). An itemization requirement also may be associated with particular tax forms/rules, or company policies, etc. In these cases, the platform server 110 may specifically request during the interactive session (in real-time or near real-time), that the cardholder scan or photograph the purchase receipt for the purposes of itemization. The subsequent interactions during the session then may use the itemized purchase information, for example, to allow the user to describe and classify each different item to different accounts or purposes, etc.

At operation 404, after determining that an interactive session should be initiated to collect additional data from the user/cardholder (403:Yes), the platform server 110 may select and/or generate a custom interactive session and initiate the interactive session at the user's mobile device 120. As noted above, the type of interactive session may be customized based on which transaction details are already known to the platform server 110, and which additional details were not received within the transaction and may be requested or required from the user/cardholder for performing certain server processes. For instance, a platform server 110 may receive transaction data at operation 401 that identifies the cardholder, merchant, and amount, but does not include additional details regarding the purchase, such as the items purchased, the other persons (employees or clients) that were involved or attended the same event, the specific projects or business discussed, etc. In some examples, if the merchant system 130 does not provide an address or location data, the platform server 110 may attempt to automatically determine and provide that information, for example, by requesting and using the GPS data from the cardholder's mobile device 120.

Along with the determination of the particular interactive session to select/initiate (e.g., based on what additional information is needed), the platform server 110 also may determine at operation 404 further data such as the particular computing device of the user on which the interactive session should be initiated, and which technologies/protocols should be used for the interactive session. For instance, in some embodiments, the platform server 110 may select the user's mobile device 120 on which to initiate the interactive session, and may select an RCS message session (e.g., in response to the determining that the user's mobile device 120 and wireless service provider support RCS), or a mobile application session (e.g., in response to determining that the mobile device 120 has the proper application installed), or may select an SMS text message session, or may send a web link via SMS to initiate the session, etc. This determination may be based on card-specific and/or user-specific preferences which may be defined when a card or user account is first setup, or may be based on per-session user or card preferences. In some cases, the platform server 110 may opt to initiate the interactive session on a different user device besides the client device 120 (e.g., a user's smartphone). For example, if the user's smartphone is off, or not with the user, or for other circumstances of time, location, etc., the platform server 110 may initiate the session via the user's smart watch, laptop, desktop, virtual assistant device, vehicle-based device, or other device associated with the cardholder. In some embodiments, features may be implemented for certain cardholders, where those cardholders may automatically re-route a session to a different user (e.g., an assistant or administrative user) rather than receiving the session at their own device, or at any time during a session. This may be done along with a voice note from the cardholder, or in other cases the cardholder may opt to defer the session and fulfill the session requirements later.

The interactive communication session between the platform server 110 and the user/cardholder mobile device 120 (or other device) may correspond to operations 404-405, proceeding generally with the platform server 110 sending requests for the needed additional purchase/transaction details, and the user/cardholder responding via their mobile device 120 to provide the requested data. In some embodiments, for enhanced security and/or fraud detection, an interactive session initiated by the platform server 110 with the cardholder's mobile device 120, may require the cardholder to verify their identity using a password, fingerprint, and/or additional biometric verification. All known types of biometric verification may be used which are compatible with the features of the cardholder's mobile device, including facial or voice recognition, fingerprint scanning, retina scanning, etc. Such techniques may provide additional security measures to defeat credit card fraud, and provide more robust configuration options (e.g., giving a card to an assistant that may be used for certain types/amounts of purchases but not for others). In some embodiments, a password requirement, fingerprint verification and/or additional biometric capture and verification may only be required for certain purchases, such as purchases of certain GL types, purchases of over a certain threshold amount, purchases within certain geographic regions, purchases that are atypical based on the cardholder's purchase history, etc. One example of a portion of an interactive communication session is illustrated by the user interface screens in FIGS. 5A-5C. In some cases, at the end of each month, the cardholder may need to affirm that the information within these records is accurate, using techniques similar to those as are used to review and sign an expense report.

Additionally, in some examples, a business or organization may generate periodic reports based on groups of transactions performed over a time period. Such reports may be generated by the platform server 110 daily, weekly, monthly, quarterly, etc., and may be used for generating aggregations of expense reports, tax compliance reports, etc. The platform server 110 may generate the reports for individual users and/or for groups of users (e.g., by department, by title, by role, etc.) over the predetermined period. In such examples, before a scheduled report is generated, the platform server 110 may initiate a second interactive session to allow the user a second opportunity to input additional transaction details and/or edit transaction details previously input by the user during the first interactive session. The second interactive session may be initiated on the user's mobile device 120, like the first communication session, or may be initiated on a separate device (e.g., the user's desktop or via the user's email account), etc. In some examples, the interaction session initiated by platform server 110 prior to generating a monthly report (or other periodic report) may be similar to identical to the interactive sessions performed between the platform server 110 and mobile device 120 at operations 404-405.

Figure 5A:
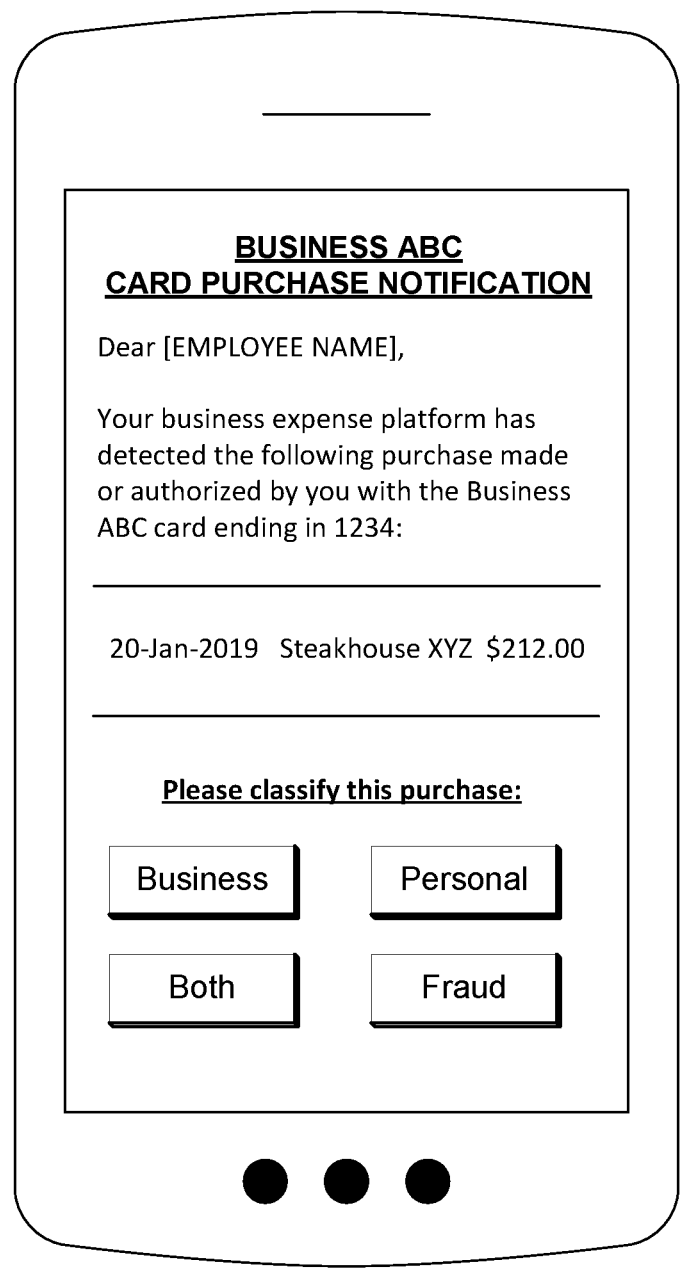
FIGS. 5A-5C are user interface screens of an example interactive mobile session to obtain additional purchase data, in accordance with one or more embodiments of the disclosure.
Figure 5B:
Figure 5C:
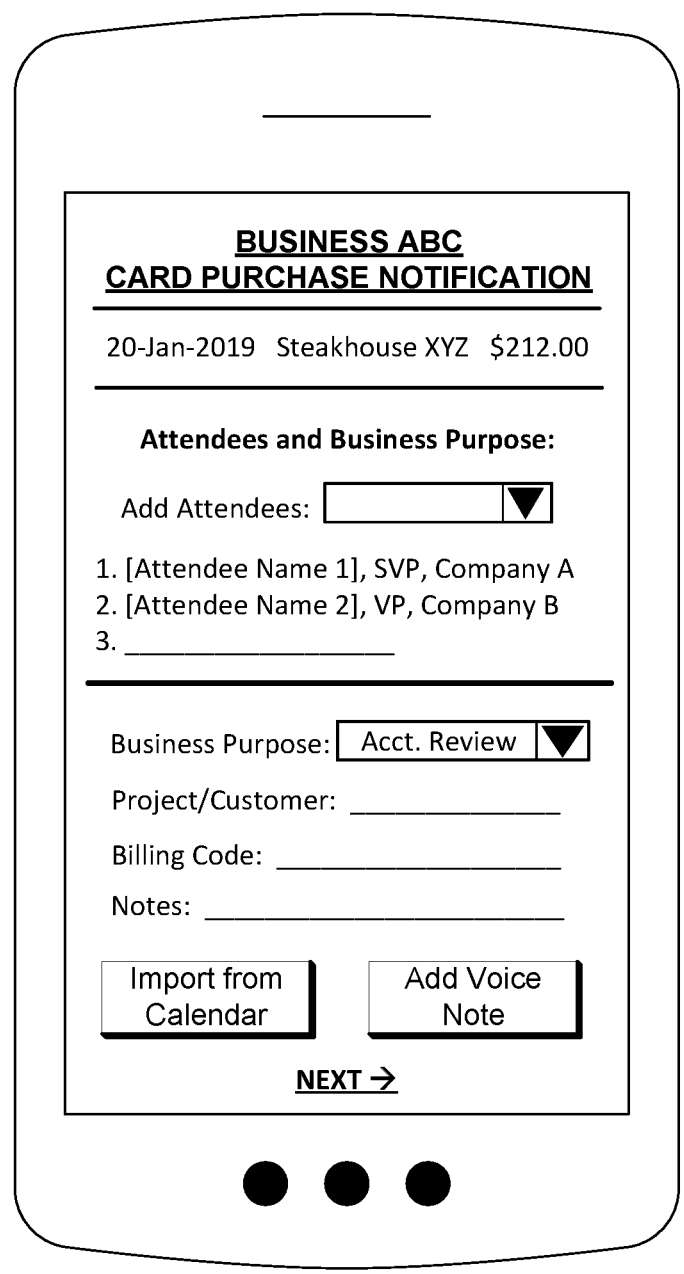
Figure 6B:
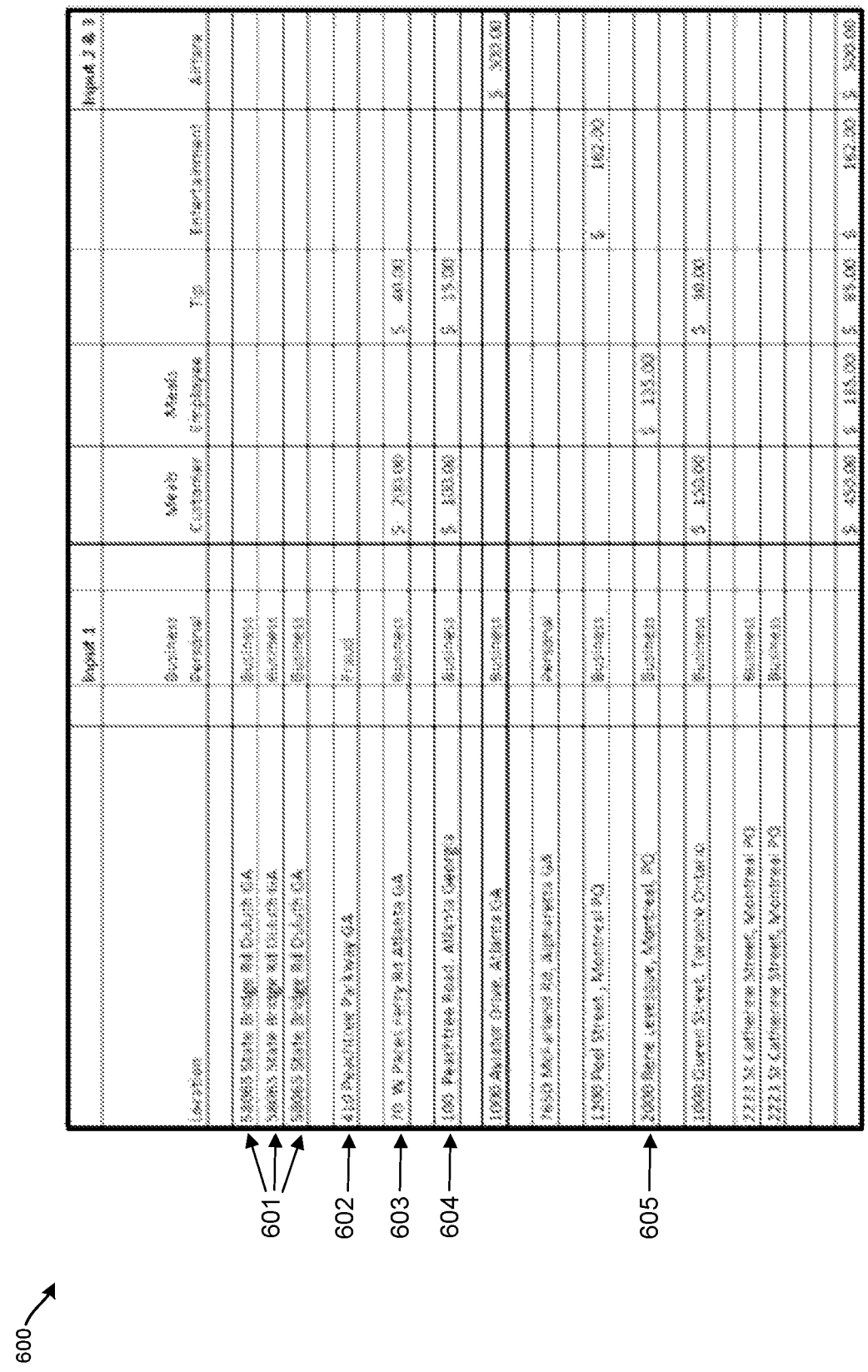
Figure 6E:
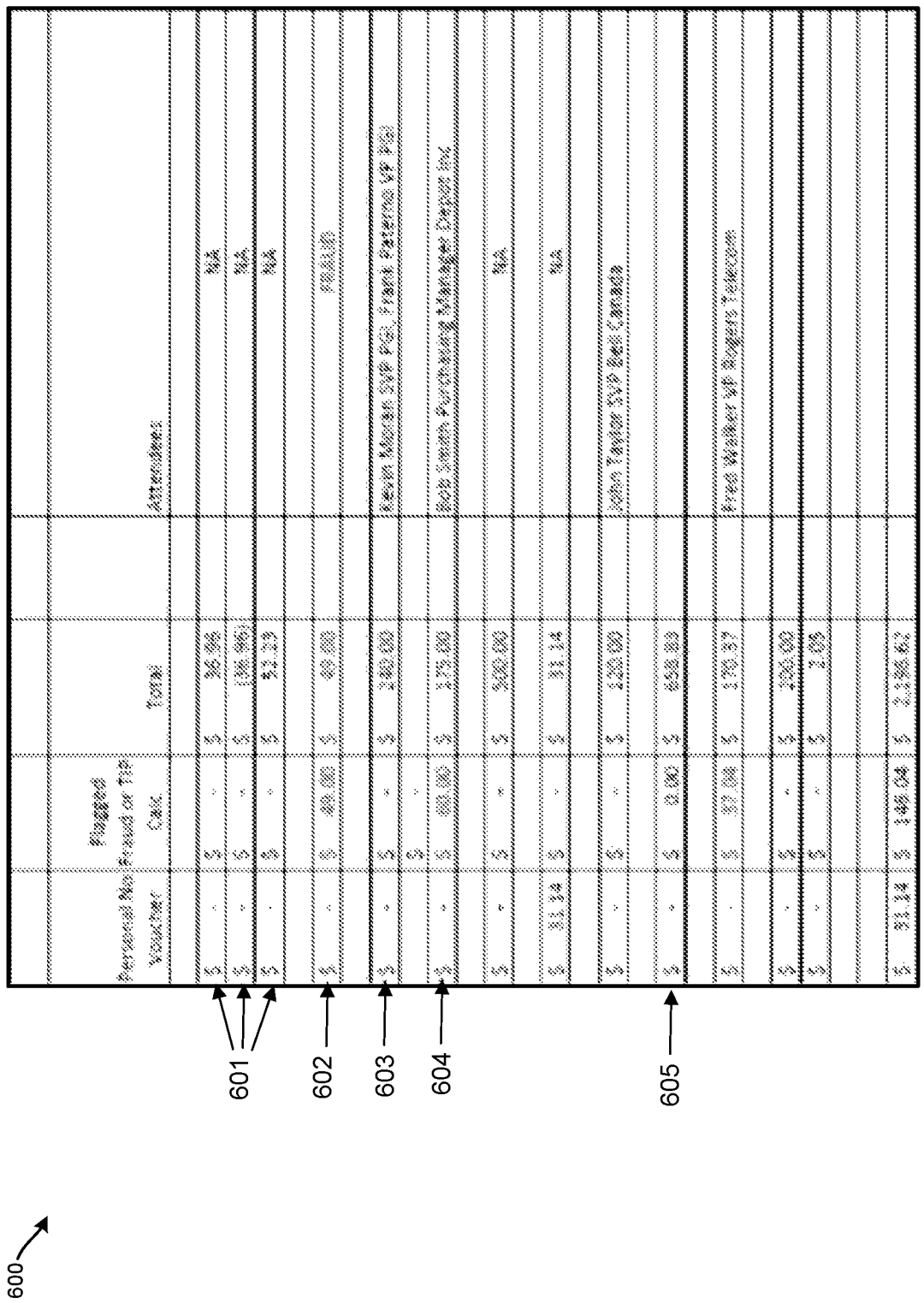
Figure 6F:
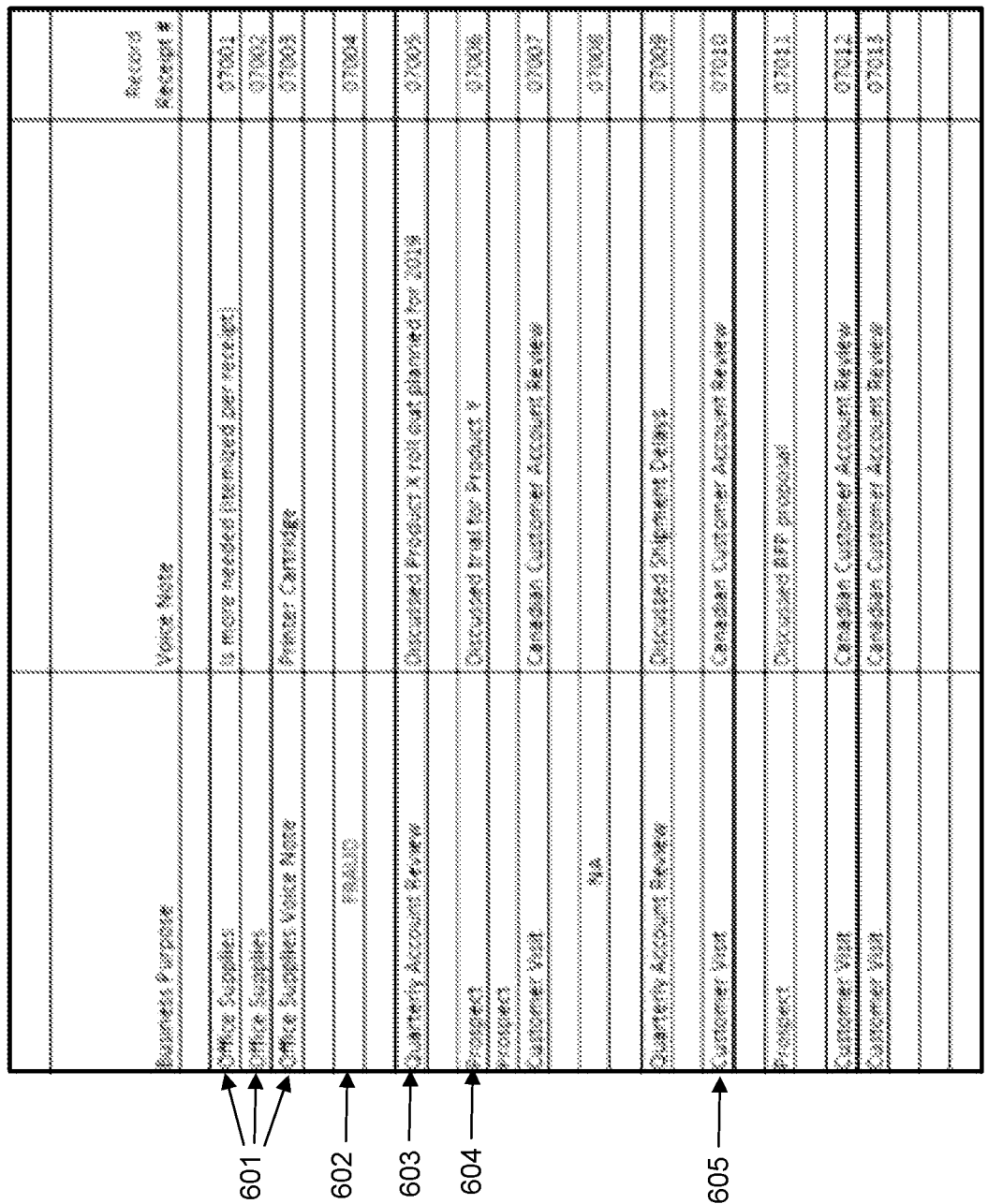

Referring briefly to FIGS. 5A-5C, these example user interface screens may be displayed on a mobile device 120 (e.g., smartphone) of a cardholder as part of an interactive session initiated by a platform server 110 to request additional purchase data following a recent purchase made by the cardholder. As shown in FIG. 5A, the platform server 110 in this example has initiated an interactive mobile session with a cardholder, in real-time or near real-time to the user's mobile device 120, in response to a recent purchase made using the cardholder's credit or debit card at Steakhouse XYZ. As shown in FIG. 5A, the initial notification from the platform server 110 may identify the user, the card used, the initial transaction details (e.g., date, merchant, amount), and then may ask the user to classify the purchase as either a business purchase, a personal purchase, a combination of business and personal, or as fraud.

In FIG. 5B, after the cardholder has indicated that this was a business-related purchase, the platform server 110 has sent a second notification asking the user to classify the category/type of the purchase into one (or more) of the seven categories shown in FIG. 5B, or "Other" to select from/input an additional category for the purchase. As shown in this example, the user also may be prompted to input a tip amount, which may be applicable for certain types of purchases (e.g., Meals, Entertainment, etc.), but not for others. In some cases, the tip amount input might only be provided after the user has selected a category of purchase for which tips are common or permitted. As discussed below in more detail, the tip amount input may be used to verify compliance with card-specific or business-specific tip rules, as well as to detect instances of tip fraud.

In FIG. 5C, after the cardholder has classified this purchase as a "Meals" expense, the platform server 110 has sent a third notification prompting the user to input various additional information required by the expense report system of Business ABC in order for the purchase to be reimbursed, tax deductible, etc. Specifically, in FIG. 5C, the cardholder is prompted to input the other attendees who were present at the meal, the business propose of the meal (e.g., a particular client account, a project discussed, or a department of Business ABC such as recruiting, marketing, etc.—where a default department value may be associated with the particular user or particular card). In some examples, a dropdown list (or other UI input component) of potential attendees may be automatically populated by the platform server 110, using one or more data sources such as the cardholder's contacts list, calendar, or emails (stored on the mobile device 120 or a backend server), an employee list of the business, a client list of the business, and/or a history of user's previous expensed meals/meetings, etc. Additionally, in some cases, the user's mobile device 120 may use short-range wireless communications (e.g., NFC, Bluetooth, etc.) to periodically establish connections with other nearby devices, and thereby determine the identities of other users that were present with the cardholder during particular meetings, events, meals, or other time periods relevant to the purchase made by the cardholder. In still other embodiments, the user's mobile device 120 may implement additional features, such as activation of a camera or microphone, along with facial and/or voice recognition software to identify the other attendees at a meeting, meal, or event. Fingerprinting and/or biometrics also may be used in some cases, and audio analyses may be performed to identify speakers, topics of conversation, etc., any or all of which may be used to determine the business purpose associated with a particular purchase. It should be understood that such automated techniques, when used and successful, may partially or wholly eliminate the need for manual input from the user during the interactive session.

Additionally, FIG. 5C provides an "Import" button that allow the user to retrieve certain purchase details (e.g., attendees, project names or codes, etc.) by accessing a current or recent appointment/calendar object within the user's digital calendar. FIG. 5C also includes a "Add Voice Note" button that allows the user to input and attach a spoken voice note to the purchase item within the data stores of the platform server 110. Such voice notes may allow the user to provide future explanations or justifications regarding the purchase, further business details, itemization of expenses, etc. Additionally, a voice-to-text engine may be used in some embodiments to transcribe the voice note, after which the text may be analyzed for purposes of routing an interactive session and/or automatically populating fields during an interactive session with data from the transcription.

Although the example in FIG. 5A-5C includes only three user interface screens, it should be understood that more or less screens may be used in different examples, depending on how much and what type of information the platform server 110 is request. Further, the interactive session performed by the mobile device 120 and the platform server 110 may be customized based on any or all of the factors discussed above (e.g., the card-specific, user-specific, business-specific configuration and preferences, the initial set of transaction details received at operation 401, the particular tasks to be performed and reports to be generated by the platform server 110 (e.g., expense reports, tax forms, etc.), and other factors. Interactive sessions also may be dynamic and modified on-the-fly, so that the menus, user interface components, and information requested on one screen may depend on the user's responses in previous screens.

For example, in some embodiments, the platform server 110 may support interactive sessions that may cascade between multiple different users. For example, during a first interactive session with the cardholder, the cardholder user may provide a subset of required information (e.g., indicating a business purchase and account name only, etc.), attach a voice note, and then transfer the interactive session to a different user, such as an assistant or accounting department personnel, to fill in the remaining relevant purchase details. In some cases, the platform server 110 may support features during interactive sessions by which the user may pause a session, or place a session a hold for a specified period of time, and then come back and finish inputting the relevant information later. Additionally, a similar feature of cascading interactive sessions between different users may be applied to identify which user is the current cardholder/purchaser within shared card scenarios. For instance, if the identity of the cardholder user cannot be determined using other techniques, the platform server 110 may initiate a series of cascading sessions with different possible cardholders via their respective mobile devices, and each cardholder may indicate that they are or are not the individual purchaser. Further, if all of the different possible cardholders indicate via their separate interactive sessions that they are not the purchaser, then the platform server 110 may immediately raise a potential fraud determination for the purchase.

In some examples, the platform server 110 may perform an automatic audit of the transaction amount, by comparing the transaction amount received with the transaction details at operation 401 (e.g., the amount on the credit card record or merchant record), to the amount on a physical transaction receipt submitted by the user. In such examples, the platform server 110 may transmit a request to the user's mobile device 120 during the interactive session (e.g., in operations 404-405) for the user to scan or photograph the physical purchase receipt received by the user for the transaction, and upload the image or scan to the platform server 110. The platform server 110 receives and analyzes the image or scan of the physical purchase receipt received, and compares the transaction amount to the transaction details received at operation 401. When the platform server 110 determines that the amount on the physical purchase receipt submitted by the user does not match the transaction amount received from the merchant servers 130 and/or institution servers 140 (e.g., plus or minus a threshold amount), the platform server 140 may automatically initiate a transaction audit or potential fraud notification for the transaction, and/or may request additional data via the interactive session with the mobile device 120 to resolve the discrepancy.

Returning now to FIG. 4, at operation 406, after the interactive session has been completed and the platform server 110 has received and stored the additional transaction details via the interactive session, the platform server 110 may perform the backend/server process using the transaction data received at operation 401 and the additional data received via the interactive session. For instance, the backend/server process may include a fraud determination, a final classification, and/or generation of purchase record(s) based on a purchase transaction. As noted above, depending on the particular embodiment, the purchase records generated at operation 406 may be paper or electronic, and may be expense report authorization forms, tax deduction forms, accounting forms, expense tracking/summary forms, or any other document or form relating to the purchase by the cardholder. Additionally, at operation 406, the platform server 110 may store and/or transmit any generated documents or forms to various parties, including the user/cardholder, the merchant, and/or may transmit the documents to separate expense processing systems, tax systems, accounting databases, etc.

In some embodiments, in operation 406 (and/or within previous operations during the process), the platform server 110 may be configured to detect that the transaction data (e.g., purchase details) received at operation 401 (and/or in subsequent operations) may correspond to a recurring or repeating purchase. For example, recurring payments (e.g., scheduled monthly payments for utilities, services, etc.) may have similar or the same characteristics of timing, merchant, description, etc. Repeating purchases, such as return visits by the same cardholder to the same hotel, gas station, rental car agency, restaurant, etc., also may have certain similar or the same characteristics. In these cases, the platform server 110 may automatically determine that the purchase is likely a recurring or repeat purchase, and in response, may modify the interactive session and/or may modify the purchase classification/report generation processes. For instance, if based on the initial purchase record information (operation 402) the platform server 110 identifies the purchase has a possible/likely recurring or repeat purchase, it may modify the interactive session by pre-populating certain fields in the interactive session, shortening the session by automatically presuming certain data, or may skip the session altogether if there is a sufficiently high likelihood of a recurring/repeating purchase that can be fully described and classified without any additional data from the cardholder or merchant.

Similarly, if a corresponding credit is applied to the card (e.g., based on a return or refund), then the platform server 110 may automatically recognize similar or the same characteristics to a previous purchase (e.g., the same merchant, credit value equaling previous purchase value, same product description, etc.), and may presume that the credit is a return/refund on a previous purchase. Such determinations may be performed semi-autonomously (e.g., requiring user confirmation or a shortened interactive session) or fully autonomously (e.g., requiring no user input and/or completely transparent to the user). When a credit back to a card is determined to correspond to a previous purchase, the platform server 110 may automatically retrieve and remove the previously stored purchase record and/or update any necessary reports/forms, thereby effectively wiping out the records of the previous purchase.

Referring briefly to FIGS. 6A-6F, an example purchase report is shown illustrative of the types of reports that may be generated at operation 406. In this example, report 600 spans FIGS. 6A-6F, and contains credit card transaction data for an example sales representative ("Sam Sales") using a company credit card for a number of purchases. Records 601-605 represent individual transactions and illustrate various advantageous features of the reports that may be generated using the techniques discussed above.

For example, record 601 corresponds to three separate transactions performed by the user at Office Max. These transactions represent an initial purchase of one or more products by the cardholder, followed by a return of the products and purchase of different products several days later. In some embodiments, the platform server 110 when processing the second and third transactions of record 601 may match these transactions to the first Office Max purchase. Specifically, the platform server 110 may automatically search for a corresponding change (e.g., the first Office Max purchase), and may then reverse the charge within the expense report records. The match the charges for the purposes of identifying returns (for reversals) duplicate charges, related charges, etc., the platform server 110 may use various data such as the merchant, purchase date, type, and amount, etc. In some cases, the platform server 110 may identify and handle reversals appropriately for the purposes of expense report generation, reimbursement decisions, tax deduction forms, accounting records, etc., even if the reversal is within a different month and/or within different billing cycle from the original purchase, and/or even if the credit amount on the return is less than the amount of the initial purchase.

In record 602, the purchase to "Wild Wing GA" for $49.00 has been flagged as a fraudulent purchase. Various techniques for identifying and confirm fraud purchases are discussed in more detail below. In this example, when record 602 has been flagged as fraud, the purchase may have initially been charged the cardholder's company account, but then once the charge is removed by the institution server 140 the cardholder's balance for expense reports, tax data, etc., may be updated accordingly by the platform server 110. Thus, for charges marked as fraud or potential fraud, the platform server 110 may continue to communicate with the issuing institution server 140 and/or merchant, in a manner transparent to the cardholder or the business, until the final fraud determination is made. Additionally, in some cases an interactive session with the cardholder may be paused or held for a period of time during which a fraud determination is performed. For example, if the purchase has been flagged as potential fraud, either based on the interaction with the platform server 110 or separately by the merchant system 130 or issuing institution server 140, an interactive session may be held open until (a) credit is issued back by the credit card company, or (b) the credit card company or the user indicates that the purchase is legitimate, after which the session can be automatically re-initiated on the cardholder's mobile device.

Record 603 may be a straightforward credit card purchase made by the cardholder at "Steakhouse XYZ," similar to the purchase in the example discussed above in FIGS. 5A-5C. Record 604 may correspond to a separate meal purchase at "Shady Diner" in Atlanta. Records 603-604 are discussed in more detail to illustrate an additional potential advantage of the system relating to tip amount verification (and/or tip fraud detection). In some embodiments, the platform server may be configured to detect and flag instances of suspected tip fraud. Such instances may occur when a restaurant employee alters the final bill signed by the customer with a tip included (e.g., by changing a "1" to "7", etc.), and/or on international purchases where a restaurant employee may inflate the bill amount on the assumption that the fraud will not be detect due to the subsequent currency conversion. To detect such fraud, the platform server 110 may be configured to ask the cardholder during an interactive mobile session (e.g., operations 404-405) to provide the tip amount. In other examples, businesses or users may preconfigure tip limits (e.g., via a business portal system 150) for specific cards, cardholders, or companies, and the platform server 110 may be configured to compare the tip amount in a final settled transaction record 603-604 to the applicable tip limits, and may then flag as potential fraud any tip exceeding the limit. In still other examples, the user may receive multiple notifications/interactive sessions, including a first pre-approved transaction amount and a second notification later after the final settled transaction is received that identifies the tip and asks the cardholder to confirm or verify the tip amount. Finally, the platform server 110 may analyze the cardholder's previous purchases to determine tipping patterns and may flag extreme outliers as potential fraud. In some cases, an automated update may be made upon determining that a tip amount has satisfied a "tip reasonableness" threshold. To the contrary, once the tip amount is received by the platform server 100, when the platform server 110 determines that the tip amount exceeds the threshold value, an additional session may be initiated with the cardholder (or other authorized approver) to confirm the tip amount.

Finally, record 605 corresponds to a hotel bill settled by the cardholder using the company credit card. In some cases, purchases at hotel corresponding to payment of hotel bills may illustrate several additional features of the systems/methods described herein. For example, referring briefly to FIG. 7, an example hotel bill is shown within an interactive session (e.g., operations 404-405). The hotel bill 700 shown within interactive session, like many hotel bills, may present challenges for expense report systems, tax compliance systems, accounting systems, and the like. For example, a single purchase corresponding to a hotel bill may include multiple different types of expenses, such as lodging (e.g., the room charge), meals (e.g., room service, hotel café or restaurant), automobile/travel (e.g., hotel parking/valet), entertainment (e.g., movies or on-site shows), and/or technology/utility expenses (e.g., Internet charges, business center expenses, office supplies, etc.). For certain target systems (e.g., expense recording/reporting systems, tax compliance systems, etc.), these different categories of purchases may be classified differently, stored as different records, and/or may have applied different configuration rules/preferences. Further, hotel bills often cover charges accrued over several days, and thus the charges may need to be itemized and/or separated out by date, to comport with certain billing cycles, evaluate daily per diems, etc. Finally, like restaurant purchases and certain other types of purchases, hotel bills may combine business and non-business expenses, and/or may combine expenses of multiple different people.

Figure 7:
FIG. 7 is a user interface screen of an example interactive mobile session to obtain additional purchase data regarding hotel bill comprising multiple different purchase types, in accordance with one or more embodiments of the disclosure.

Accordingly, for purchases corresponding to hotel bill payments, the platform server 110 may perform additional analyses and/or may initiate a customized interactive session in order to itemize and classify the various types of charges on the hotel bill. In some cases, the platform server 110 may automatically parse a hotel bill received from a merchant system 130, user device 120, or issuing institution server 140, and then automatically may itemize and aggregate the different category types within the bill. Thus, a single hotel bill may be automatically processed by the platform and separated into relevant partitions (e.g., by purchase type, date, user, etc.) in a prepopulated report or grid, for expense report purposes, tax compliance or accounting purposes, in a manner seamless and transparent to the cardholder and without any manual interaction needed to parse and partition the hotel bill. However, in other examples, the platform server 110 may present text-based or graphical components in an interactive mobile session with the user, in which the cardholder may review/classify individual charges on a hotel bill 700, group charges by date, type, user, etc., as shown in FIG. 7.

As discussed above in reference to operation 406, following an interactive session (if necessary), the platform server 110 may receive and store the transaction details received at operation 401, the additional transaction data received via the interactive session with the mobile device 120, and/or additional related data, after which the platform server 110 may classify and store data indicative of the transaction. For instance, the platform server 110 may store purchase data associated with a point-of-sale or network based (e.g., Internet) purchase, and generate purchase records, expense reports, tax forms, and other documentation based on the transaction. In various embodiments, the expense report platform server 110 may support features, including the functionality to enable distinguishing and filtering business card use and personal card use. For example, if the cardholder is using a corporate card, then any personal expenses should be classified as such and should be reimbursed back to the company. In contrast, if the cardholder is using a personal card, then all valid business expenses may qualify for an expense voucher. Thus, the platform server 110 may automatically determine and categorize purchases made by both personal cards and business cards, and then automatically calculate and generate the proper statements, reports, vouchers, etc. Additionally within operation 406, the platform server 110 may employ a set of algorithms during report generation, for example to confirm final purchase amounts, adjust amounts as needed for currency conversion and exchange rates (e.g., by retrieving and applying the current exchange rates of the credit card issuer 140). Additionally, the platform server 110 may adjust reports/documents to determine tip amounts and add tips to the associated meal expense classification. In some embodiments, the platform server 110 may implement additional functionality to check for tip amount reasonableness, as part of a fraud determination. Platform server 110 also may perform an audit of record completeness for any/all purchase records and may send messages for any incomplete record data before a statement closes (especially when the platform server 110 is integrated within the issuing institution server 140). The platform server 110 also may match debits to credits, mapping against original inputs for offset (some of which may be in the prior period) and may generate/transmit a notification or request confirmation if the corresponding debit/credit is not found. Finally, the platform server 110, during the purchase processing/report generation of operation 406, may create record codes to be attached to receipts, may perform per diem checks (e.g., verify purchases against max per diems), and provide users to ability to view, edit, and augment purchase reports via the platform. In some embodiments, a both company credit cards and personal cards may have associated authentication codes that access company-approved template requirements. For instance, the backend system of a company or organization may setup predefined accounts, authorization codes, etc., to allow a personal card to quickly and seamlessly access a company-defined set of functionalities based on the purchase type or other purchase characteristics. Individual users may use such codes to pull down a company-authored template and classify a purchase.

While various techniques and examples described herein include the platform server 110 obtaining additional transaction data by initiating interactive mobile session(s) with mobile devices 120, and using the additional transaction information to perform backend/server processes, the platform server 110 may perform similar or identical techniques to perform enhanced transaction security processes, data security processes, fraud detection processes, and/or for monitoring network transactions (e.g., Internet-based purchases) of a remote workforce. For instance, any of the backend/server process or tasks described herein may refer to transaction security or data security processes, fraud detection processes, or remote workforce management processes, etc. As discussed below, in such examples, the additional data obtained via the interactive session with user's mobile device 120 may include user identity and/or authentication data collected to perform user identity verification and/or authentication for security purposes.

The platform server 110 may implement any of the techniques described herein to perform enhanced security processes for transactions and/or accounts. For example, the platform server 110 may determine at operation 403 (or in a similar operation) whether or not the transaction data received at operation 401 requires an express user confirmation or additional user identity verification for security purposes. For instance, the platform server 110 may determine that a user identity verification and/or security check is required for a transaction, by comparing the transaction data received at operation 401 to an expected set of transaction parameters or range of parameters. By way of example, if a transaction amount exceeds a threshold, or the time of the purchase is outside of an expected purchase time window, or the merchant, item name, or GL code of the purchase transaction is not on a listing of expected merchants/items/GL codes, then the platform server 110 may determine that an additional transaction security/verification process is to be initiated. In various examples, the platform server 110 may apply different sets of transaction thresholds/parameters to different users or groups of users (e.g., based on roles, title, geographic region, and/or organization, etc.), alone or in any combination, when determining whether or not an additional security verification is to be performed for a transaction.

When the platform server 110 determines that a transaction requires additional security verification (which may correspond to operation 403:Yes), it may determine one or more mobile devices 120 associated with the transaction and then initiate interactive sessions with the mobile device(s) as described above, to obtain the additional security verifications for the transactions. For instance, the platform server 110 may, via the interactive session, transmit the amount, date and time, and merchant to a mobile device 120, and request that the user confirm that the purchase was legitimate. In some examples, the platform server 110 also may perform user identity verification and authentication via the interactive session, to detect fraud attempts for transactions performed with a borrowed or stolen card. For instance, during the interactive session, the platform server 110 may request that the user of the mobile device 120 provide authentication data, such as a predetermined username and password of the user, or a signature of the user which may be written via a touch screen of the mobile device 120 and compared by the platform server 110 to the signature from previous transaction receipts or records of the same user. Additionally, the platform server 110 may request, receive, and verify user biometric data during the interactive session with the mobile device 120, such as the user's fingerprint, voiceprint, retinal scan, facial recognition, and/or any other biometric data obtained from the user. In some examples, for unexpected purchases that exceed predetermined threshold values (e.g., transaction amounts, merchants, purchase types, etc.) and require additional security verification, the platform server 110 also may request that the user provide a written explanation for the purchase via the interactive session, which may be stored in a record associated with the purchase and/or evaluated to determine whether or not to approve the purchase for an expense report or other backend process.

In some examples, the platform server 110 may analyze the responses from the user during the interactive session (e.g., at operations 404-405) and based on the responses may determine whether to approve or not approve the transaction (e.g., for an expense report), and/or may determine whether or not freeze the instrument (e.g., credit card) or financial account used to perform the transaction. For instance, if the user does not respond to the interactive session via the mobile device 120 within a certain time threshold (e.g., 5 minutes, 10 minutes, . . . , 30 minutes, . . . , 1 hour, etc.), then the platform server 110 may automatically freeze the credit card and/or account used to make the purchase. Similarly, if the user indicates during the interactive session that the purchase was not legitimate, or if the platform server 110 cannot successfully verify the user's identity using the authentication data provided via the interactive session (e.g., the password, signature, biometric data, etc.), then the platform server 110 may automatically freeze the credit card and/or account used to make the purchase. In implementations when the platform server 110 is not integrated with the issuing institution server 140 for the credit card, the platform server 110 may transmit a request to the issuing institution server 140 to freeze the card. In such cases, where a credit card (or financial account or other instrument) is either frozen or restricted (e.g., restricted to transactions of limited amounts under a threshold, limited types of purchases, specific merchants, etc.), the platform server 110 also may generate and transmit a notice to the cardholder of the restriction/cancellation.

In still other examples, the platform server 110 may monitor and track the network transactions (e.g., Internet purchases) of a remote worker or group of remote workers, and may initiate interactive sessions in response to certain transactions performed by a remote worker. As described above, employees (or workers) may perform transactions at merchant point-of-sale locations such as restaurants, hotels, and other retail locations. Additionally, workers also may perform network-based transactions including Internet purchases made via their mobile devices 120 or other computing devices (e.g., work computers, laptops or desktop computers). For instance, workers in a remote work force may work from home or other locations, during which they still log into the secure/corporate networks, access company resources, and/or perform work-related transactions such as business-related purchases via the Internet with a company credit card or other company financial account credentials.

For remote workers, and in other scenarios where users perform Internet-based transactions, the platform server 110 may initiate interactive sessions with the worker's mobile devices 120, using similar or identical techniques to those discussed above for merchant point-of-sale purposes. For instance, the platform server 110 may initiate an interactive session with the mobile device 120 of a remote worker in response to an Internet purchase made by the remote worker using a company credit card or other financial account associated the company, if the transaction data for the Internet purchase (e.g., received at operation 401) meets a set of predetermined criteria of the platform server 110 (e.g., transaction amount criteria, merchant name/type criteria, GL code criteria, transaction date/time criteria, etc.). In various examples, any combination of the criteria described herein may be used by the platform server 110 to determine when to initiate an interactive session with the user's mobile device 120 in response to a network-based purchase made by the user using a business credit card and/or financial account. The platform server 110 may initiate interactive mobile sessions in these examples, either to obtain additional information relating to the transaction for performing backend server processes, and/or to provide additional user identity checking and security verifications for the Internet purchases, as described above. For instance, for an Internet purchase made by a remote worker, the platform server 110 may initiate an interactive session with the user's mobile device 120 to obtain from the user the associated client account(s), a line-item listing of which items purchased are associated with which accounts, the business purpose for the purchases, etc., so that the platform server 110 may complete an expense reporting process and/or tax compliance process. For another Internet purchase made by the remote worker, the platform server 110 may initiate another interactive session with the user's mobile device 120 to perform transaction/data security techniques, including verifying the identity of the user (e.g., via a password, signature, biometrics, etc.), and confirming the legitimacy of the Internet purchase. As described above, for an interactive session initiated with a mobile device 120 for additional transaction security, if the user does not respond to the session within a predetermined time period, the user indicates during session that the purchase was not legitimate, and/or if the platform server 110 cannot successfully authenticate the user's identity via the using the authentication data provided during the session, then the platform server 110 may freeze the card and/or financial account used to make the online purchase.

In some cases, the platform server 110 may implement a rules-based system for monitoring and tracking the remote transactions (e.g., Internet purchases) of remote workers. For instance, as described above, the platform server 110 may store a set of predetermined rules associated with individual remote workers and/or groups of remote workers. For transactions, such rules may identify the characteristics of approved transactions, non-approved transactions, and transactions requiring additional information and/or further security verification. For instance, a set of rules for a remote worker or set of workers may identify categories of transaction amounts, merchants, items to be purchased, purchase times or frequencies, etc. When the platform server 110 determines that a remote network-based transaction does not comply with the predetermined rules for performing purchases, the platform server 110 may initiate an interactive session to the remote worker's mobile device 120, using the techniques described above.

Instead of or in addition to using a rules-based system, the platform server 110 may track the remote transactions of a remote workforce, and may implement trained machine-learned models and algorithms to automatically detect deviations from the predicted network-based transactions of the remote workforce. For instance, the platform server 110 may receive and store data corresponding to the transactions performed by a set of remote workers in a particular role and at a particular organization (e.g., items purchased, merchants, purchase dates/times, associated client accounts, financial cards or accounts used, etc.), and may use the data as training data to generate one or more machine-learned models trained to output deviating and non-deviating transactions. In such examples, when an Internet purchase or other network transaction performed by a remote worker is determined by the platform server 110, via trained machine-learned models, to be a deviation from a predicted pattern of remote transactions, the platform server 110 may initiate an interactive session with the remote worker's mobile device 120. The platform server 110 may maintain one or more data stores to collect and store training data and/or trained models corresponding to the patterns and predictions of remote transactions performed by the remote workforce.

Figure 8:
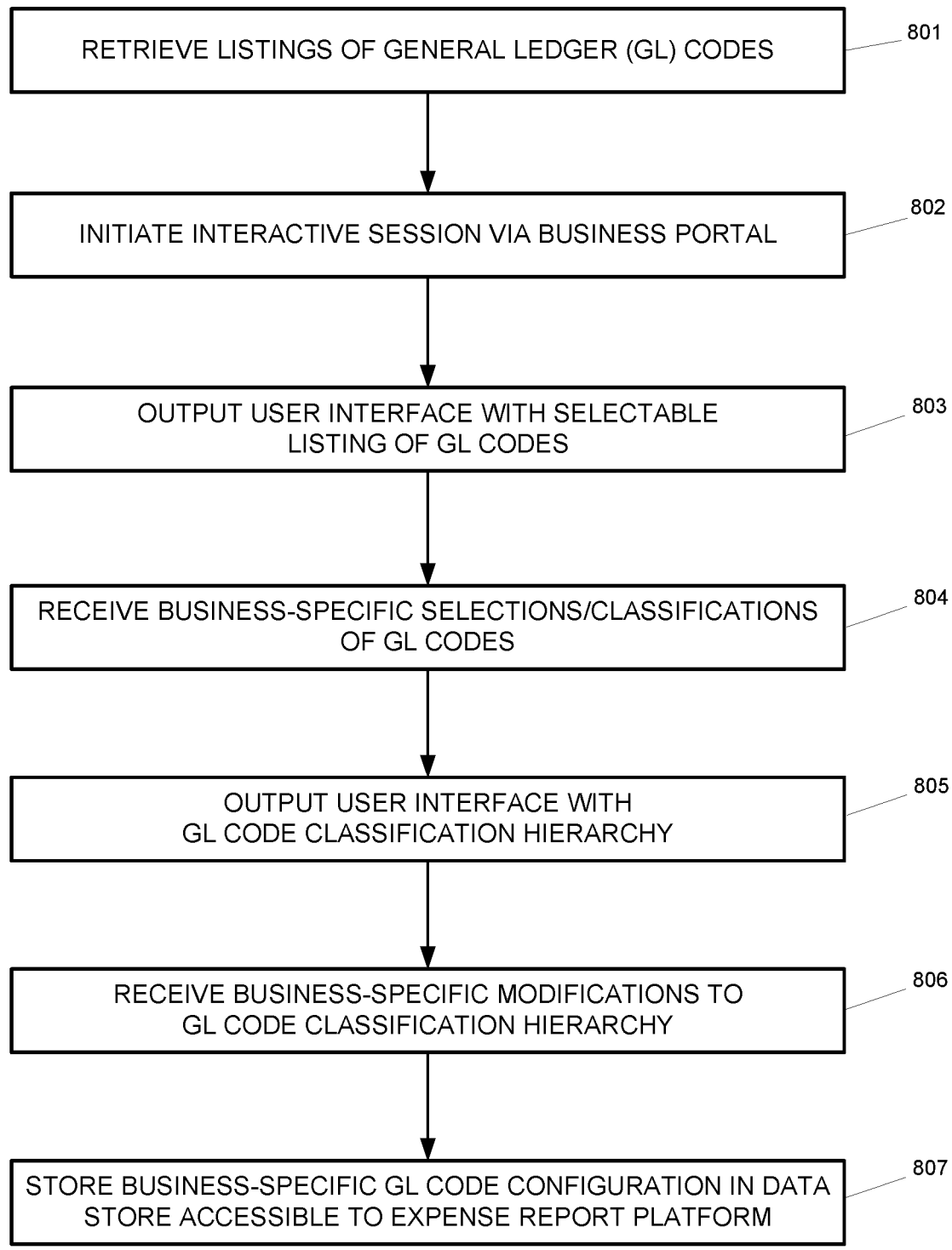
FIG. 8 is a flow diagram illustrating an example general ledger (GL) type configuration process, in accordance with one or more embodiments of the disclosure.

Referring now to FIG. 8, another flow diagram is shown illustrating an example process of performing a general ledger (GL) configuration applicable to a particular card, cardholder, and/or business, which may be applied by an expense recording and platform servers 110 when analyzing and processing purchases. As described below, the operations in this process may be performed by one or more platform servers 110, in conjunction with business portal system 150, to allow business users (e.g., controllers, CEOs, CFOs, administrators, or other authorized parties) to customize the GL configurations used by the business. Thus, these techniques also may be described in terms of the computing environments and devices/systems described above in FIGS. 1-3B. However, it should be understood that the techniques and operations described below or are not limited to the particular computing systems and hardware components described above in reference to FIGS. 1-3B, but may be implemented using various other devices or combinations of systems/devices to perform some or all of the features and functionality described below.

At operation 801, the platform server 110 may receive and/or store one or more listings of general ledger (GL) codes. As is known in the relevant technical fields, GL codes are shorthand codes, typically alphanumeric, that may be assigned to different types of financial transactions (assets, liabilities, equity, revenues, and expenses) within an accounting form or other financial data maintained by a business. In some cases, the platform server 110 may use an industry standard set of GL codes, while in other a listing of GL codes may be specific to a particular business or organization, or may be further customized by departments, groups, or individuals.

At operation 802, in request to a request from a business portal system 150 to configure or set GL preferences for one or more financial accounts, the platform server 110 may provide an interface (e.g., a user interface and/or programmatic interface) to initiate an interactive session that allows the requested GL configuration. As discussed below, the GL configurations that may be performed in various examples may include defining subsets of GL codes representing purchase types that are/are not acceptable for a particular business. In this context, an "acceptable" purchase type may be one that is permitted to be expensed to the company and/or reimbursable to the cardholder. In other embodiments, acceptable may mean tax-deductible, or any other designation of acceptable or non-acceptable purchases for accounting systems, expense recording/reporting systems, etc. Thus, performing a GL configuration may be secure task limited to authorized users/roles, such as corporate officers, controllers, and authorized system administrators, and operations 802-807 may require secure logins and encryption and/or security protocols. Further, as discussed below, the GL configuration techniques described herein may be performed for particular businesses or groups of businesses. Additionally or alternatively, separate GL configurations may be defined for particular company credit cards (while other cards have different GL configurations), or for particular employees/cardholders (while other employees/cardholders have different GL configurations). For instance, one set of GL configurations that define acceptable purchase types, limits, etc., may be defined for a first company credit card issued to the company's CFO, while a separate set of GL configurations may be defined for a second company credit card issued to a junior sales rep at the company, and yet another set of GL configurations may be defined for a local office manager that is frequently tasked with purchasing office supplies via their personal credit card, and so on.

At operation 803, the platform server 110 may output a user interface to the business portal system 150, with a selectable listing of GL codes that may be configured by the user at operation 804. For example, referring briefly to FIG. 9, an example GL configuration user interface 900 is shown to allow the user to toggle different GL codes and/or groups of GL codes, thereby defining the categories of purchases that are "acceptable" (e.g., expensible or reimbursable) for the company credit card XXXX-XXXX-XXXX-1234 of Business ABC. As shown in this example, the user may use the toggle controls within the user interface 900 to select individual GL types that are or are not permitted for purchase by this particular company credit card. In some cases, different templates may be established corresponding to different user roles/levels, for instance, a first template for a company CFO, a second template for Sales Managers, a third template for Sales Reps, and so on. These different templates may have different approved charge types, different purchase limits, different per diems, different options, and so on. Thus, these different templates may be associated with different cardholders based on role, level of authority, level of seniority, etc., to enforce the different purchase limitations of different cardholders. Further, it should be understood that, in various embodiments, the GL configurations performed in these examples might not be propagated to any financial institution system, and thus might not cause any purchases to be declined. Rather, these GL configurations might only define which purchases can be reimbursed, expensed, tax-deductible for a particular business, etc. Of course, in other embodiments, the GL configurations defined at operation 804 may be transmitted to merchant systems 130, issuing institution server 140, and/or user mobile devices 120, in order to prevent any non-accepted purchase types to be performed by the cardholder using the particular company card. In some embodiments, a particular card may be turned off for some or all expense types, if the purchases made using the card have reached a threshold (e.g., a monthly budgeted amount).

Although the example user interface 900 shown in FIG. 9 may allow users (e.g., administrators) to toggle "Yes" or "No" to define the acceptable purchase types in the GL configuration, additional configurations may be defined in other examples. For instance, rather than a simply Yes/No option for each GL type, other user interfaces may allow users at operation 804 to approve purchases of particular GL types within certain spending limits (e.g., a purchase limit, per diem limit, etc.), or at certain specified merchants, certain specified locations, etc. Additionally, in some embodiments, a GL configuration user interface may provide another option for each GL type that indicates that purchase of the GL type may potentially be permitted, but may require a manual review and approval from an authorized approver.

At operation 805, after the user has defined the set of acceptable GL types for the credit card (and/or individual cardholder), the platform server 110 may output a second user interface allowing the user to setup, review, and modify a GL code taxonomy (or classification hierarchy). For example, at operation 806 the platform server 110 may receive a set of business-specific modifications to the GL classification hierarchy, and at operation 807 the platform server 110 may store the business-specific GL code modifications in a data store.

As discussed below, a GL classification hierarchy may refer to a specific set of groupings and/or parent-child relationships among the different GL types. These classification hierarchies may be used by the expense report platform server 110 and/or other backend business systems to process, classify, and approve purchases, to generate expense reports, tax forms, and other documents, etc. Additionally, as with the selection of acceptable or permitted GL types discussed above, the defining of a GL classification hierarchy may be performed for a business, and/or for individual cards or cardholders.

Figure 10A:
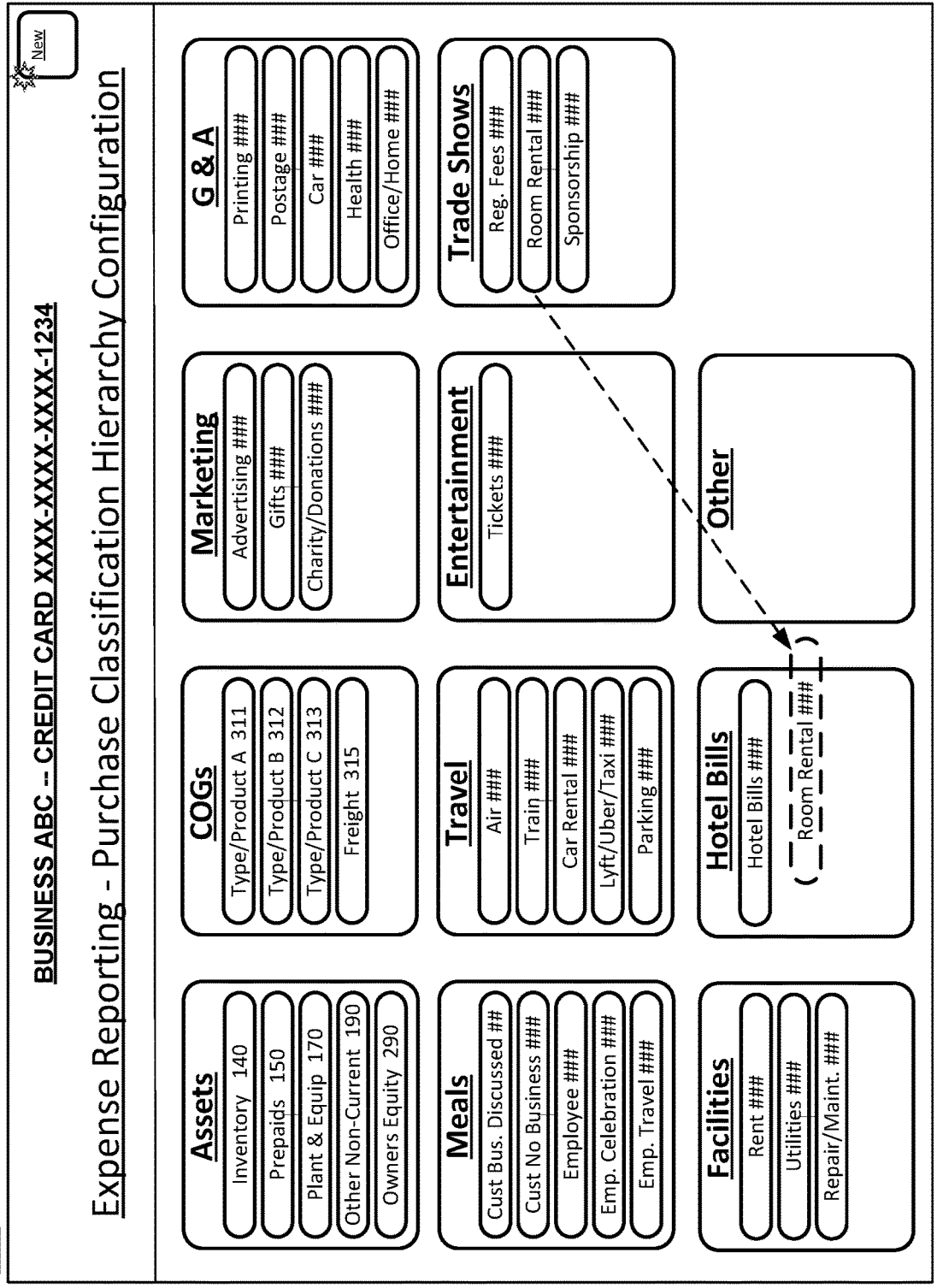
FIGS. 10A-10B are additional user interface screens within an example interactive session to perform GL type configuration and define classification hierarchies, in accordance with one or more embodiments of the disclosure.
Figure 10B:
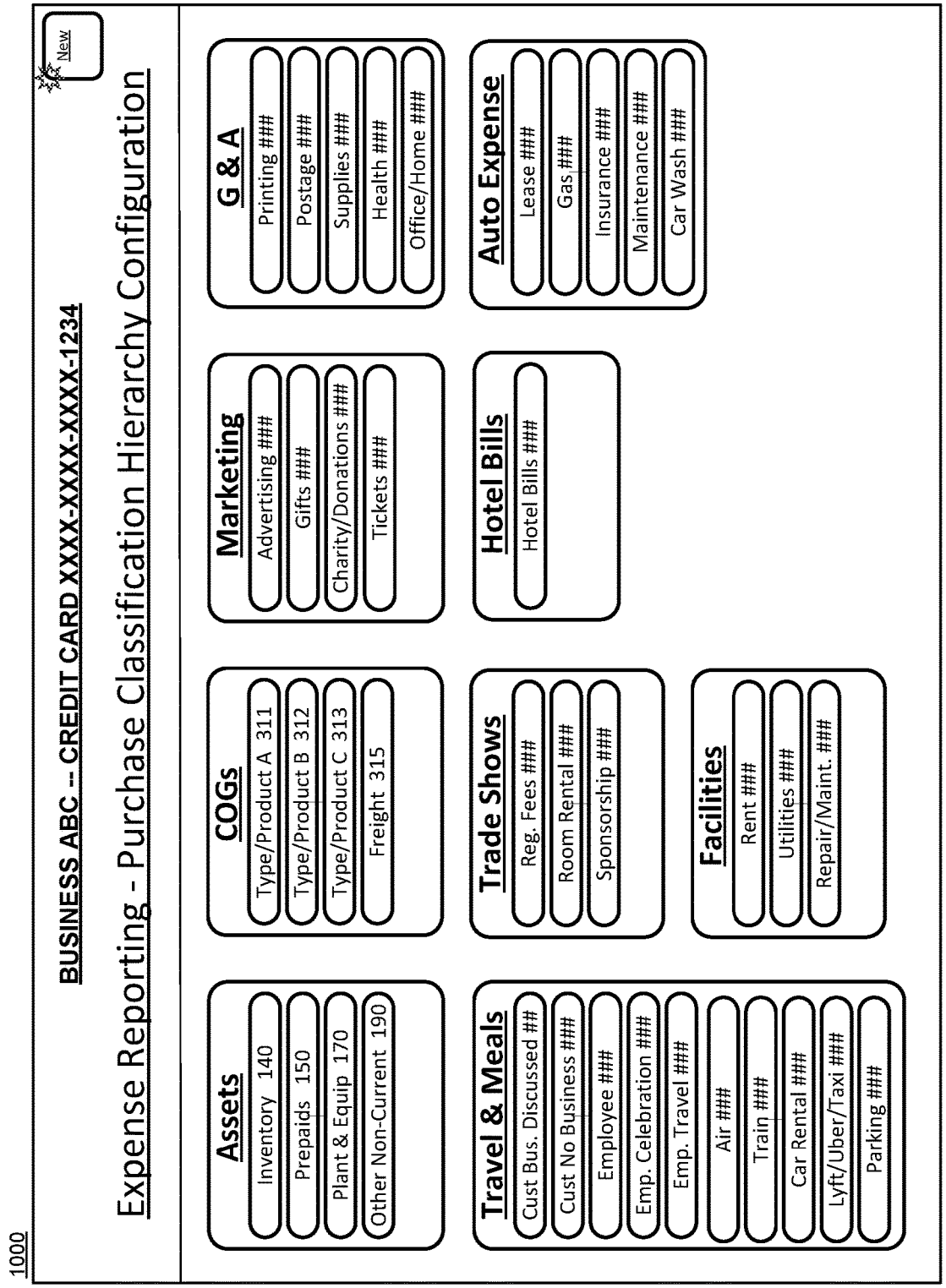

Referring briefly to FIGS. 10A-10B, an example user interface 1000 is shown with various UI components to allow a business user, interacting with the platform via a business portal system 150, to configure, modify, and save a GL classification hierarchy that will be applied for the business. As shown in FIG. 10A, a listing of all GL types has been displayed, and has been grouped into the separate business-specific groupings of Assets, COGs, Marketing, G&A, Meals, Travel, Entertainment, Trade Shows, Facilities, Hotel Bills, and Other. In some embodiments, user interface 1000 may be associated with user interface 900, and any GL type for which card purchases are not permitted might not be shown at all in user interface 1000. In this example, user interface 1000 also supports drag-and-drop capabilities to allow the user to modify the groupings. Thus, in FIG. 10B, a modified business-specific hierarchy may be generated and saved. It should be understood that using the tool in FIGS. 10A-10B, and/or using similar embodiments, different businesses may define different classification hierarchies, and that these groupings and hierarchies then may be used to monitor compliance with approved purchase types/limits, to generate reports and forms, etc.

Figure 11:
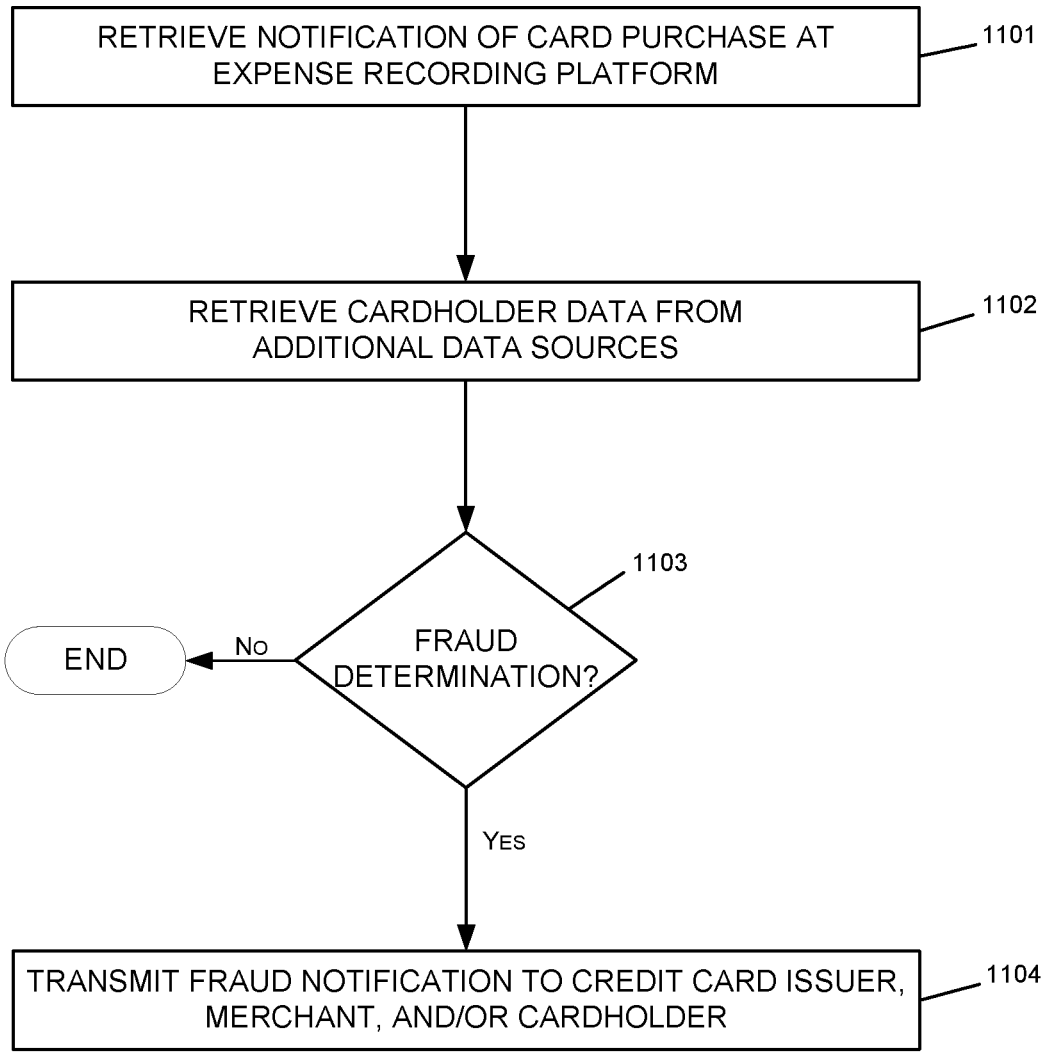
FIG. 11 is a flow diagram illustrating a technique of fraud detection based on purchase/transaction details and additional data sources, in accordance with one or more embodiments of the disclosure.
Figure 12:
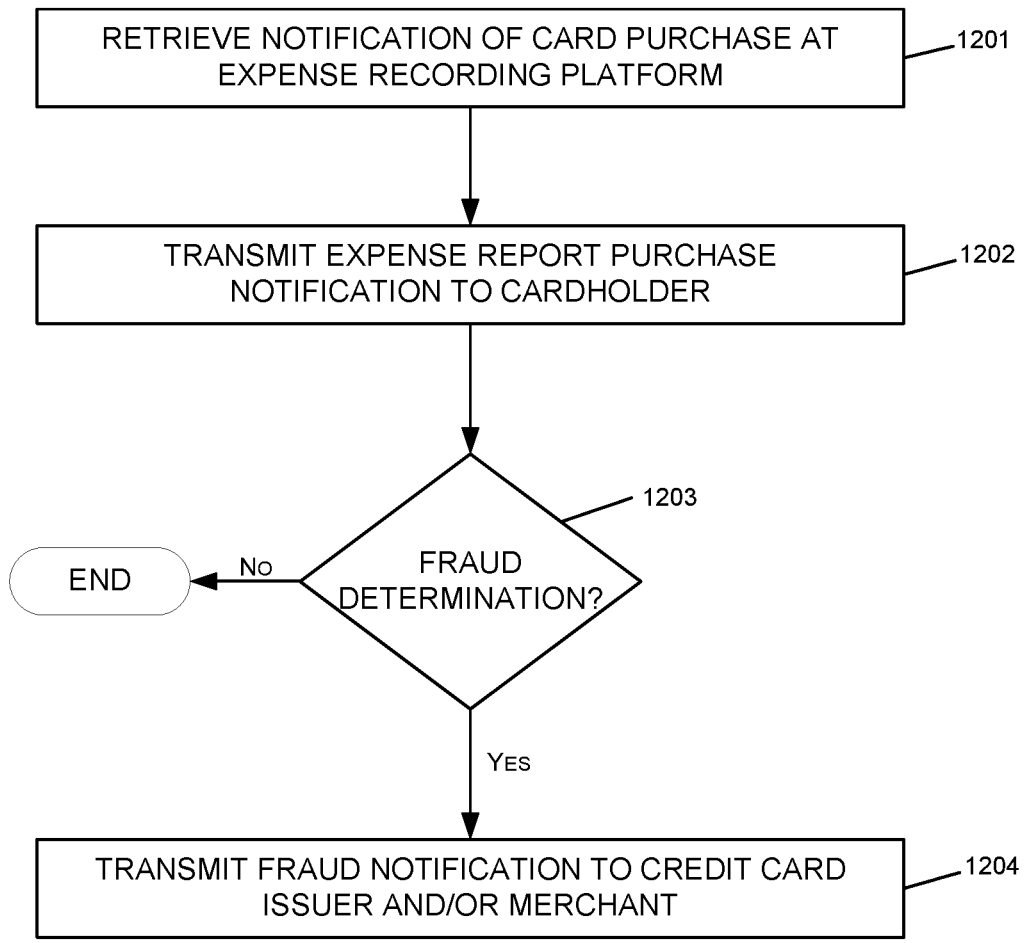
FIG. 12 is a flow diagram illustrating a technique of fraud detection based on purchase/transaction details and additional data sources, in accordance with one or more embodiments of the disclosure.
Figure 13:
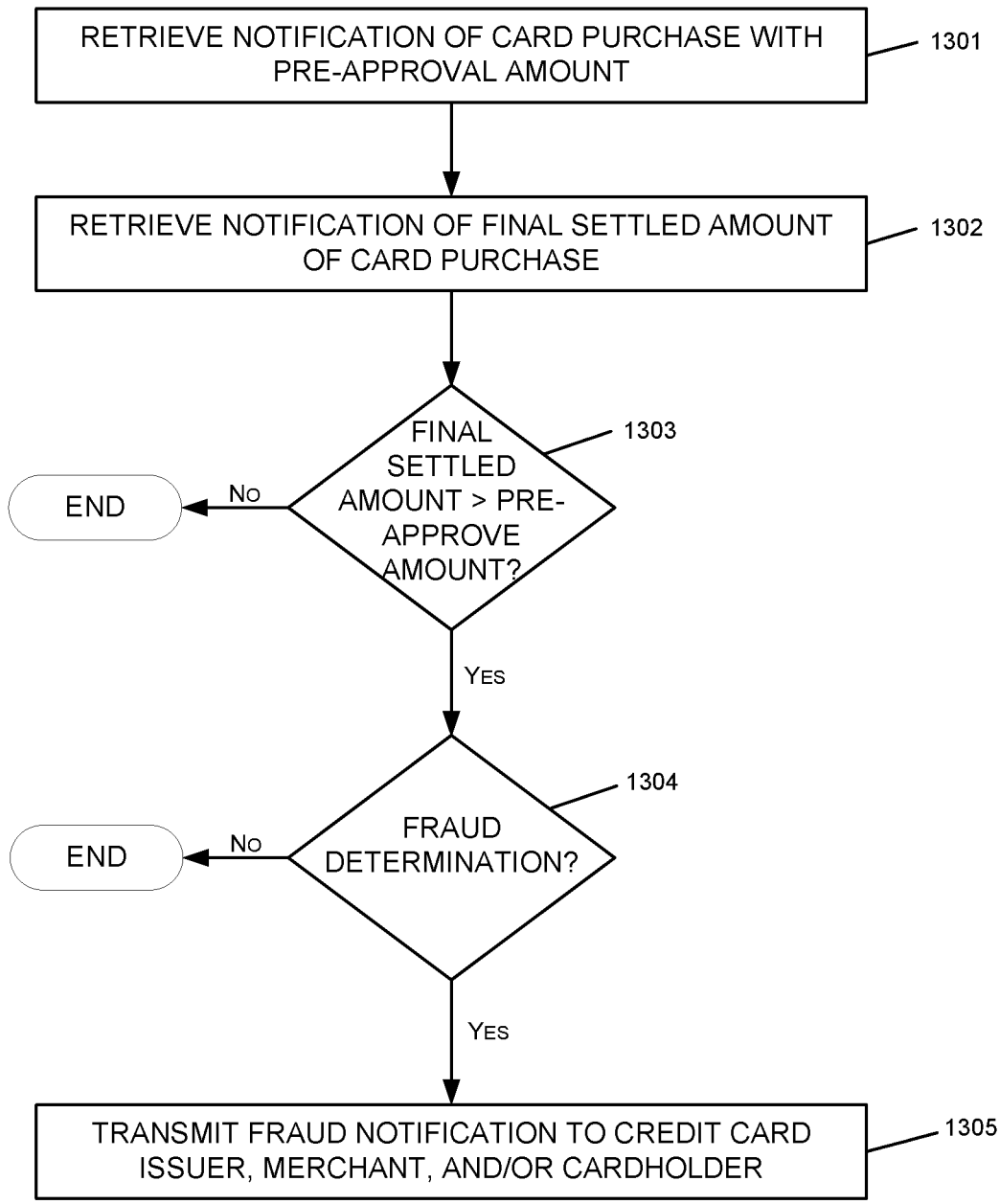
FIG. 13 is a flow diagram illustrating a technique of fraud detection based on purchase/transaction details and additional data sources, in accordance with one or more embodiments of the disclosure.

Referring now to FIGS. 11-13, additional flow diagrams are showing further techniques for detecting fraud or potential fraud based on purchase/transaction data as well as additional data sources. In the examples below, three separate techniques are shown for detecting potential fraud by a platform server 110, in response to purchase/transaction data and/or additional data retrieved by the server 110. It should be understood that these techniques may be performed separately in some embodiments, or in other embodiments that any or all of these techniques may be combined by a platform server 110 to better detect fraud. Additionally, although these techniques are also described in terms of the computing environments and devices/systems described above in FIGS. 1-3B, it should be understood that the techniques and operations described below or are not limited to the particular computing systems and hardware components described above in reference to FIGS. 1-3B, but may be implemented using various other devices or combinations of systems/devices to perform some or all of the features and functionality described below.

In some embodiments, the platform server 110 may be configured to provide additional fraud-checking and confirmation steps for "card not present" transactions such as online purchases and other distance transactions where the physical card is not presented to the merchant. Because card not present transactions may present higher fraud risks to merchants and financial institutions, in some embodiments, the platform server 110 may initiate interactive user sessions for some/all card not present transactions, in order to immediately confirm with the user the legitimacy of the purchase. The platform server 110 then may immediately convey the legitimacy information back to the merchant system 130, and the merchant system 130 may be configured not to provide the purchased good or service until the confirmation of legitimacy is received from the platform server 110.

In FIG. 11, a flow diagram is shown corresponding to an automated fraud determination and response that may be performed autonomously by a platform server 110, based on the available purchase data, and with little or no interaction required by the cardholder or other user. At operation 1101, the platform server 110 may receive a notification of a purchase by a user/cardholder, corresponding to a credit card purchase or purchase with another financial instrument. Thus, the notification in operation 1101 may be similar or identical to the notification received at operation 401, discussed above, and may be received from the server(s) 110, merchant system 130, issuing institution server 140, etc. At operation 1102, the platform server 110 may retrieve additional cardholder data from various other data sources, in order to further analyze the purchase notification received at operation 1101. For example, at operation 1102 the platform server 110 may access the GL configuration data from data stores 112-114, to receive the corresponding configuration data and preferences (e.g., GL code approved/not approved, etc.) for the user, card, and/or business. Additionally or alternatively, the platform server 110 may access the user's purchase history from data stores 112-114, including previous purchasing patterns, types of purchases, tip amounts, etc. In some embodiments, the platform server 110 also may access the user's mobile device 120 at operation 1102, or other associated user devices/servers, to retrieve the user's current location (e.g., via GPS data), the user's current activities (e.g., via the user's calendar, email, or other sensor data collected at the mobile device 120), and/or other current user status data available from other data sources.

At operation 1103, based on the purchase transaction details received at operation 1101, and the additional cardholder data received at operation 1102, the platform server 110 may perform one or more automated fraud or potential fraud determinations. For example, if the current location of the cardholder (e.g., via the GPS data from the cardholder's device 120) doesn't match the merchant location of the purchase, then the platform server 110 may determine that the purchase is likely a fraudulent one. Additionally or alternatively, the platform server 110 may compare the purchase type, amount, merchant, time and date, etc., to the cardholder's previous purchase patterns, to determine that the current purchase may potentially be fraud. In some cases, the platform server 110 may confirm that the user's calendar information, current activity status, and the like, also correspond to the purchase details at operation 1101. For example, the platform server 110 may determine that the cardholder is currently on a plane, driving, exercising, or with certain individuals at certain locations based on data from the cardholder's calendar, email system, mobile device, activity tracker, vehicle, etc., and then may further determine that the status information are not consistent with the recent purchase details received at operation 1101. When one or any combination of these fraud indicators is determined to apply, the platform server 110 may determine that the purchase is fraud or potential fraud (1103:Yes). In such cases, at operation 1104, the platform server 110 may take one or more appropriate actions, including transmitting fraud notifications to the cardholder's device 120 (e.g., to allow for user confirmation/rejection of the purchase), the merchant system 130, and/or one or more card issuing institution servers. Additionally, upon detection of a fraud or likely fraud, the platform server 110 may classify the purchase accordingly and update one or more purchase records, reports, accounting data, etc.

In FIG. 12, a second flow diagram is shown corresponding to a semi-automated fraud determination and response that may be performed by the platform server 110. This example may be performed separately, or in conjunction with the autonomous techniques discussed in FIG. 11. In this example, at operation 1201, which may be similar or identical to operation 1101, the platform server may receive a purchase notification and transaction details, as discussed above. In response to the purchase notification, the platform server 110 may transmit an expense report purchase notification to the cardholder. In some cases, the platform server 110 may transmit a notification in reasons to every purchase made by a card associated with a cardholder, while in other cases only certain purchases (depending on GL type) and/or potentially fraudulent purchases (based on the analysis in FIG. 11) may result in purchase notifications at operation 1202. Additionally, as discussed above in FIG. 5A, a purchase notification and verification for fraud checking may be integrated into an interactive session with the user to obtain additional purchase information.

Depending on the cardholder's response to the purchase notification at operation 1202, the platform server 110 may determine that the purchase is fraud (1203:Yes), or that it is not fraud. In some cases, for enhanced fraud detection, the notification transmitted by the platform server 110 may require the cardholder to verify a response of "Not Fraud" with additional security measures, such as a password, fingerprint, or biometrics. These techniques may provide additional security for instances when the cardholder's phone has been lost, stolen, or is in the possession of another user attempting a fraudulent/unauthorized purchase with the card. If the cardholder confirms the purchase as fraudulent, or fails to sufficient verify the purchase as not fraud (1203: Yes), then the platform server 110 may perform various operations at 1204 similar or identical to those discussed above in operation 1104, such as transmitting one or more fraud notifications, updating database records and reports, etc.

In FIG. 13, a third flow diagram is shown corresponding to a separate type of fraud determination (referred to as "tip fraud") which may be implemented separately or in conjunction with the additional fraud checking techniques discussed above. As discussed above, instances of tip fraud may occur when a restaurant employee alters the final bill signed by the customer (e.g., by changing a "1" to "7" within the tip line or final bill amount, etc.), and/or may occur in international purchases where a restaurant employee may inflate the bill amount on the assumption that the fraud will not be detect due to the currency conversion. In this example, tip fraud may be detected autonomously or semi-autonomously, by first determining the tip amount associated with a restaurant purchase, hotel purchase, or various other purchase types, and then determining whether or not the tip amount is likely to represent fraud.

In this example, at operation 1301 and 1302, the platform server 110 receives multiple purchase notifications corresponding to a pre-approval purchase amount (operation 1301), and a final settled amount (operation 1302). Each notification in this example may be similar or identical to the notifications discussed above in operation 1104. Also, in some embodiments, the platform server 110 need not receive two separate purchases in order to determine the tip amount. For instance, a single notification for the final settled amount may specify both the overall purchase amount and the tip portion of the overall amount. Alternatively, in response to a pre-approval notification at operation 1301 or a final settled purchase notification at operation 1302, the platform server may retrieve the tip amount by contacting the merchant system 130, cardholder mobile device 120, etc.

At operation 1303, assuming that the cardholder's purchase included some amount of tip (1303:Yes), then the technique may proceed to operation 1304 to evaluate whether the tip amount is likely to be fraudulent. The determination at operation 1304 may be performed automatically and/or may involve confirmation and verification from the cardholder via an interaction mobile session. For instance, the platform server 110 may store a set of tipping limits, rules, or historical tipping data that may be used to determine if the tip on the current purchase is within an appropriate tipping range. Such limits, rules, or historical data may be stored at a global level by the platform server 110, or may be specific to a particular business, particular card, and/or particular cardholder. In such cases, the determination by the platform server 1110 may be fully automatic, and if the current tip amount exceeds the threshold amount or percentage (1304:Yes), then the platform server 110 may determine that the tip is likely fraudulent. Additionally or alternatively, during or before operation 1304, the platform server 110 may initiate an interactive session with the cardholder via mobile device 120. During such sessions, the cardholder may be prompted to input the tip amount, or verify that the tip amount in the final settled purchase record is accurate. Depending on the cardholder's responses, the tip may be determined to be fraudulent (1304:Yes) or may be determined not to be fraudulent. Finally, at operation 1305, if the platform server 110 determined the tip to be fraudulent, or fails to sufficient verify that the tip was not fraud (1304:Yes), then the platform server 110 may perform operations similar or identical to those discussed above in 1104, such as transmitting one or more tip fraud notifications, updating database records and reports, etc.

To detect such fraud, the platform server 110 may be configured to ask the cardholder during an interactive mobile session (e.g., operations 404-405) to provide the tip amount. In other examples, businesses or users may preconfigure tip limits (e.g., via a business portal system 150) for specific cards, cardholders, or companies, and the platform server 110 may be configured to compare the tip amount in a final settled transaction record 603-604 to the applicable tip limits, and may then flag as potential fraud any tip exceeding the limit. In still other examples, the user may receive multiple notifications/interactive sessions, including a first pre-approved transaction amount and a second notification later after the final settled transaction is received that identifies the tip and asks the cardholder to confirm or verify the tip amount. Finally, the platform server 110 may analyze the cardholder's previous purchases to determine tipping patterns and may flag extreme outliers as potential fraud.

The methods, systems, and devices discussed above are examples. Various configurations may omit, substitute, or add various operations (or method steps) or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer server comprising:
one or more processors; and
one or more non-transitory computer-readable media storing computer-executable instructions that, when executed, cause the one or more processors to perform operations comprising:
receiving, at the computer server, transaction data indicative of a transaction associated with a financial account;
determining, based on the transaction data, whether the transaction is eligible for an expense voucher from an organization;
based on determining that the transaction is eligible for an expense voucher, determining a required set of expense voucher input data for an expense reporting process associated with the organization;

determining a subset of the required set of expense voucher input data that is not included in the transaction data, wherein the subset includes at least one of:
 data identifying an item purchase type not included in the transaction data;
 data identifying an attendee associated with the item purchase not included in the transaction data; or
 data identifying a topic of discussion associated with the item purchase;

determining a mobile device with which to initiate an interactive session, based at least in part on the subset of the expense voucher input data that is not included in the transaction data;

determining an interactive session type, based at least in part on the mobile device;

initiating the interactive session between the computer server and the mobile device, using the determined interactive session type;

receiving the subset of the expense voucher input data from the mobile device, via the interactive session;

performing, by the computer server, the expense reporting using the transaction data and the subset of the expense voucher input data received via the interactive session.

2. The computer server of claim 1, wherein the expense reporting process further includes a transaction security process, and wherein the operations further comprise:
 receiving first user identity data from the mobile device via the interactive session;
 comparing the first user identity data to second user identity data associated with the mobile device; and
 based on the comparison between the first user identity data and the second user identity data, modifying a status at the computer server associated with at least one of an instrument or the financial account associated with the transaction.

3. The computer server of claim 1, wherein the transaction is an online purchase transaction initiated by a remote worker, and wherein the operations further comprise:
 receiving, via the interactive session, remote transaction data associated with the online purchase transaction;
 comparing the remote transaction data to a set of remote transaction parameters associated with the remote worker; and
 based on the comparison between the remote transaction data and the set of remote transaction parameters associated with the remote worker, modifying a status at the computer server associated with at least one of an instrument or the financial account associated with the transaction.

4. The computer server of claim 1, wherein receiving the subset of the expense voucher input data comprises:
 receiving a selection, from the mobile device via the interactive session, of a customer account of the organization.

5. The computer server of claim 4, wherein receiving the subset of the expense voucher input data further comprises:
 retrieving a listing of individuals associated with the customer account of the organization;
 transmitting the listing of individuals to the mobile device via the interactive session; and
 receiving, via the interactive session, a selection of one or more of the individuals associated with the account.

6. The computer server of claim 4, wherein receiving the subset of the expense voucher input data comprises:
 transmitting a listing of charges associated with the transaction to the mobile device via the interactive session; and
 receiving, via the interactive session, a selection of one or more charges in the listing of charges.

7. A method comprising:
 receiving transaction data indicative of a transaction performed via a merchant system;
 determining, based on the transaction data, whether the transaction is eligible for an expense voucher from an organization;
 based on determining that the transaction is eligible for an expense voucher, determining a required set of expense voucher input data for an expense reporting process associated with the organization;
 determining a subset of the required set of expense voucher input data that is not included in the transaction data, wherein the subset includes at least one of:
  data identifying an item purchase type not included in the transaction data;
  data identifying an attendee associated with the item purchase not included in the transaction data; or
  data identifying a topic of discussion associated with the item purchase;
 determining a mobile device with which to initiate an interactive session, based at least in part on the subset of the expense voucher input data that is not included in the transaction data;
 determining an interactive session type, based at least in part on the mobile device;
 initiating the interactive session with the mobile device, using the determined interactive session type;
 receiving the subset of the expense voucher input data from the mobile device, via the interactive session;
 performing the expense reporting process using the transaction data and the subset of the expense voucher input data received via the interactive session.

8. The method of claim 7, wherein the expense reporting process includes a transaction security process, and wherein the method further comprises:
 receiving first user identity data from the mobile device via the interactive session;
 comparing the first user identity data to second user identity data associated with the mobile device; and
 based on the comparison between the first user identity data and the second user identity data, modifying a status associated with at least one of an instrument or account associated with the transaction.

9. The method of claim 7, wherein the transaction is an online purchase transaction initiated by a remote worker, and wherein the method further comprises:
 receiving, via the interactive session, remote transaction data associated with the online purchase transaction;
 comparing the remote transaction data to a set of remote transaction parameters associated with the remote worker; and
 based on the comparison between the remote transaction data and the set of remote transaction parameters associated with the remote worker, modifying a status associated with at least one of an instrument or account associated with the transaction.

10. The method of claim 7, wherein receiving the subset of expense voucher input data further comprises:
 retrieving a listing of individuals associated with a customer account of the organization;

transmitting the listing of individuals to the mobile device via the interactive session; and receiving, via the interactive session, a selection of one or more of the individuals associated with the account.

11. The method of claim 7, wherein receiving the subset of expense voucher input data comprises:

transmitting a listing of charges associated with the transaction to the mobile device via the interactive session; and receiving, via the interactive session, a selection of one or more charges in the listing of charges.

12. The method of claim 11, further comprising:

retrieving a listing of general ledger codes associated with the organization;

determining a first general ledger code associated with a first charge in the one or more selected charges; and comparing the first general ledger code to the listing of general ledger codes associated with the account.

13. The method of claim 7, wherein determining the mobile device comprises:

determining a customer account of the organization, based at least in part on the transaction data;

determining a user, from a plurality of users associated with the account; and determining the mobile device based at least in part on the user.

14. The method of claim 7, wherein determining the mobile device comprises:

determining a customer account of the organization, based at least in part on the transaction data;

determining a user associated with the account; and determining the mobile device, from a plurality of mobile devices associated with the user, based at least in part on the transaction data.

15. The method of claim 14, wherein determining the mobile device comprises selecting the mobile device, from the plurality of mobile devices associated with the user, and comprises at least one of:

determining a device type of the mobile device;

determining a software application installed on the mobile device; or determining a current operational status of the mobile device.

16. The method of claim 7, further comprising:

determining security authentication data required for the transaction, based at least in part on the transaction data; and performing a security authentication technique, via the mobile device, during the interactive session, to receive the security authentication data.

17. The method of claim 7, wherein initiating the interactive session with the mobile device is performed after the transaction performed via the merchant system is completed.

18. The method of claim 7, wherein the subset of expense voucher input data is received from the mobile device via a data transmission circumventing the merchant system.

19. The method of claim 7, wherein the transaction is a cryptocurrency transaction between the merchant system and a user performed using a cryptocurrency wallet on the mobile device, and wherein determining the mobile device is based at least in part on identifying the cryptocurrency wallet associated with the mobile device.

20. The method of claim 7, wherein determining the interactive session type comprises determining at least one of:

an SMS session type;

a Rich Communication Service (RCS) session type;

a web browser-based session type; or a mobile application session type.

21. The method of claim 7, wherein determining the mobile device with which to initiate the interactive session comprises:

determining a customer account of the organization, based at least in part on the transaction data;

determining a plurality of user devices associated with the account;

determining, for each of the plurality of user devices associated with the account, a current device location; and comparing the current device location, for each of the plurality of user devices, to the location at which the transaction was performed.

* * * * *